(12) United States Patent
Bachman et al.

(10) Patent No.: US 8,936,389 B2
(45) Date of Patent: Jan. 20, 2015

(54) APPARATUS AND METHOD TO FEED LIVESTOCK

(75) Inventors: Stephen E. Bachman, Amarillo, TX (US); Michael E. Hubbert, Amarillo, TX (US); Dale Garcia, Troy, TX (US); Michael L. Ray, Guymon, OK (US); Troy Brunson, Guymon, OK (US)

(73) Assignees: Ganado Technologies Corp., Canyon, TX (US); Nutrition Physiology Co., LLC, Guymon, OK (US)

( * ) Notice: Subject to any disclaimer, the term of this patent is extended or adjusted under 35 U.S.C. 154(b) by 0 days.

(21) Appl. No.: 12/940,014

(22) Filed: Nov. 4, 2010

(65) Prior Publication Data
US 2011/0165286 A1    Jul. 7, 2011

Related U.S. Application Data

(63) Continuation-in-part of application No. 12/692,494, filed on Jan. 22, 2010, and a continuation-in-part of application No. 12/181,203, filed on Jul. 28, 2008.

(51) Int. Cl.
| | | |
|---|---|---|
| *A01K 5/00* | (2006.01) | |
| *A01K 5/02* | (2006.01) | |
| *B01F 7/08* | (2006.01) | |
| *B01F 13/00* | (2006.01) | |
| *B01F 13/10* | (2006.01) | |
| *B01F 15/04* | (2006.01) | |

(52) U.S. Cl.
CPC .............. *A01K 5/0275* (2013.01); *A01K 5/00* (2013.01); *A01K 5/001* (2013.01); *B01F 7/086* (2013.01); *B01F 13/0035* (2013.01); *B01F 13/1002* (2013.01); *B01F 13/1055* (2013.01); *B01F 13/1072* (2013.01); *B01F 15/0445* (2013.01)

USPC .......................................... 366/141; 366/142

(58) Field of Classification Search
USPC ................................... 366/141, 142
See application file for complete search history.

(56) References Cited

U.S. PATENT DOCUMENTS

| | | | | |
|---|---|---|---|---|
| 1,694,442 A | | 12/1928 | Gustafson | |
| 2,984,386 A | * | 5/1961 | White | 222/58 |
| 3,393,899 A | * | 7/1968 | Wells | 366/141 |

(Continued)

OTHER PUBLICATIONS

International Preliminary Report on Patentability dated Jan. 11, 2012.

(Continued)

*Primary Examiner* — David Sorkin
(74) *Attorney, Agent, or Firm* — Dale F. Regelman; Quarles & Brady LLP

(57) ABSTRACT

A method and apparatus for feeding livestock is presented. The method includes providing a mobile feed preparation apparatus that includes a feed container containing a base feed, a conveying assembly that receives the base feed from the feed container, a feed additive assembly comprising a reservoir containing a feed additive, where the feed additive assembly is in flowable communication with the conveying assembly, a weight sensitive platform having a weigh cell, where the reservoir is mounted on said platform, and a controller in communication with the conveying assembly and the weigh cell. The method further includes weighing the reservoir to determine a first weight, dispensing from the mobile feed preparation apparatus a feed ration, and weighing the reservoir to determine a second weight. Additionally, the method includes calculating a distributed amount of the feed additive using the first weight and the second weight.

11 Claims, 14 Drawing Sheets

(56) References Cited

U.S. PATENT DOCUMENTS

| | | | |
|---|---|---|---|
| 3,806,001 A | | 4/1974 | Pratt |
| 4,733,971 A | | 3/1988 | Pratt |
| 4,812,047 A | * | 3/1989 | Baumann .................. 366/141 |
| 4,891,097 A | | 1/1990 | Hyoty et al. |
| 5,008,821 A | | 4/1991 | Pratt et al. |
| 5,139,792 A | | 8/1992 | Ware et al. |
| 5,380,485 A | * | 1/1995 | Takahashi et al. ............ 422/62 |
| 5,457,627 A | * | 10/1995 | Cureton et al. ............. 705/34 |
| 5,462,354 A | | 10/1995 | Neier |
| 5,487,603 A | | 1/1996 | Hoff et al. |
| 5,636,118 A | | 6/1997 | Brewster et al. |
| 6,082,304 A | | 7/2000 | Crain |
| 6,263,833 B1 | | 7/2001 | Runyan et al. |
| 6,343,285 B1 | | 1/2002 | Tanka et al. |
| 6,347,753 B1 | | 2/2002 | Anderson |
| 6,484,079 B2 | | 11/2002 | Buckelew et al. |
| 6,901,369 B2 | * | 5/2005 | Cureton et al. ............. 705/1.1 |
| 7,367,361 B2 | | 5/2008 | Steingass |
| 7,484,911 B2 | | 2/2009 | Frelich |
| 7,489,993 B2 | | 2/2009 | Coffee et al. |
| 2002/0015354 A1 | | 2/2002 | Buckelew |
| 2002/0179750 A1 | | 12/2002 | Truan et al. |
| 2003/0076736 A1 | | 4/2003 | Buker et al. |
| 2004/0028808 A1 | | 2/2004 | Williams et al. |
| 2005/0204587 A1 | | 9/2005 | Kime |
| 2009/0027995 A1 | | 1/2009 | Bachman et al. |
| 2012/0312240 A1 | | 12/2012 | Bachman et al. |
| 2013/0092087 A1 | | 4/2013 | Bachman et al. |

OTHER PUBLICATIONS

International Search Report and Written Opinion dated Mar. 14, 2011.

\* cited by examiner

| | PHYSICAL LOCATION | GPS LOCATION | TARGET WEIGHT BASE FEED | ACTUAL WEIGHT BASE FEED | BASE FEED NOMINAL DELIVERY WINDOW | BASE FEED ALERT? | TARGET WEIGHT PERCENT ADDITIVE A | ACTUAL WEIGHT PERCENT ADDITIVE A | ADDITIVE A NOMINAL DELIVERY WINDOW | ADDITIVE A ALERT? | ● ● ● |
|---|---|---|---|---|---|---|---|---|---|---|---|
| FORMULATION NUMBER 1 | NORTH FEED BUNK | 33.3078333 111.6554722 | 1000 POUNDS | 950 POUNDS | +/- 10% | NO | 5 | 3 | +/- 10% | YES | |
| FORMULATION NUMBER 2 | | | | | | | | | | | |
| FORMULATION NUMBER 3 | | | | | | | | | | | |
| ● ● ● | | | | | | | | | | | |
| FORMULATION NUMBER N | | | | | | | | | | | |

426

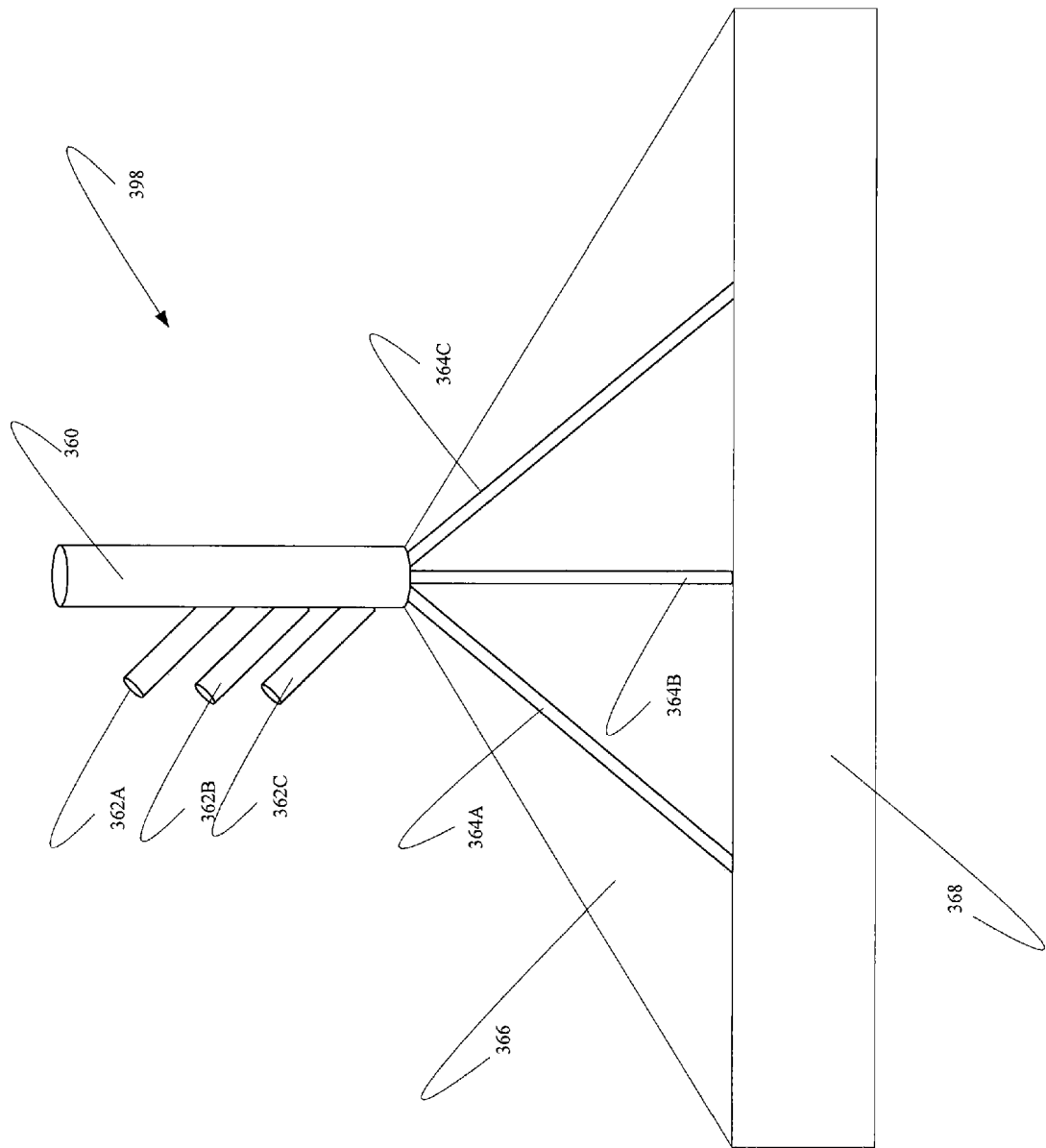

APPARATUS AND METHOD TO FEED LIVESTOCK

CROSS-REFERENCE TO RELATED APPLICATIONS

This is a Continuation-In-Part Application claiming priority to a U.S. Non-Provisional Application having Ser. No. 12/181,203, which was filed on Jul. 28, 2008, and a U.S. Non-Provisional Application having Ser. No. 12/692,494, which was filed on Jan. 22, 2010.

BACKGROUND OF THE INVENTION

FIG. 1A illustrates a prior art apparatus to feed livestock. Apparatus 100 comprises cab portion 102 and trailer assembly 105. In certain embodiments, powered unit 102 and trailer 105 comprise an integral manufacture.

Trailer assembly 105 comprises feed container 110 and delivery assembly 120 disposed therein. Referring now to FIGS. 1A and 1B, feed 150 is disposed in feed container 110 and is gravity fed into delivery assembly 120. In the illustrated embodiment of FIGS. 1A and 1B, delivery assembly 120 comprises a first auger 130 and a second auger 140. In other embodiments, delivery assembly 120 may comprise a single auger. In still other embodiments, delivery assembly 120 comprises more than 2 augers. In certain embodiments, multiple augers may operate in a counter-rotating fashion.

Referring now to FIGS. 1C and 1D, apparatus 100/105 is disposed adjacent to a livestock feeding site and positioned such that feed trailer 105 is disposed adjacent to feed bunk 170. Side 190 of feed trailer 105 is formed to include aperture 180. Delivery assembly 120 is energized, and feed 150 is transferred from feed container 110, through aperture 180, across chute 160 and into feed bunk 170. In some instances, the size of aperture 180 is adjustable by means of operable door to regulate feed 150 flow.

The prior art apparatus of FIGS. 1A, 1B, and 1C, can deliver the same feed formulation to a plurality of feeding locations. However, different formulations cannot be delivered to different locations with the same load of feed 150.

SUMMARY OF THE INVENTION

Applicants' invention comprises a method of feeding livestock. The method includes providing a mobile feed preparation apparatus that includes a feed container containing a base feed, a conveying assembly that receives the base feed from the feed container, a feed additive assembly comprising a reservoir containing a feed additive, where the feed additive assembly is in flowable communication with the conveying assembly, a weight sensitive platform having a weigh cell, where the reservoir is mounted on said platform, and a controller in communication with the conveying assembly and the weigh cell. The method further includes weighing the reservoir to determine a first weight, dispensing from the mobile feed preparation apparatus a feed ration, and weighing the reservoir to determine a second weight. Finally, the method includes calculating a distributed amount of the feed additive using the first weight and the second weight.

The invention further comprises a method of feeding livestock. The method includes providing a mobile feed preparation apparatus having a feed container containing a base feed therein, a conveying assembly that receives a first quantity of the base feed from the feed container, a feed additive assembly comprising a reservoir containing a feed additive therein, a spray nozzle, where the spray nozzle is in flowable connection with the feed additive assembly and the conveying assembly, and a controller in communication with the conveying assembly and the feed additive assembly. The method further includes disposing the first quantity of the base feed from the feed container into the conveying assembly, spraying, using the spray nozzle, the first quantity of the base feed with a second quantity of the feed additive, and dispensing from the mobile feed preparation apparatus the first quantity of the base feed in combination with the second quantity of the feed additive.

The invention further comprises a mobile feed preparation apparatus, having a feed container for storing a base feed therein, a conveying assembly that receives a first quantity of the base feed from said feed container, and a feed additive assembly comprising a reservoir for storing a feed additive therein, where the feed additive assembly is in flowable connection with the conveying assembly. Additionally, the mobile feed preparation apparatus includes a controller in communication with the conveying assembly and the feed additive assembly.

BRIEF DESCRIPTION OF THE DRAWINGS

The invention will be better understood from a reading of the following detailed description taken in conjunction with the drawings in which like reference designators are used to designate like elements, and in which:

FIG. 5 schematically depicts a database aspect of the invention;

FIG. 8 depicts an embodiment of a spray nozzle assembly of Applicants' feed preparation apparatus.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A U.S. Non-Provisional Application having Ser. No. 12/181,203, which was filed on Jul. 28, 2008, is hereby incorporated by reference herein. A U.S. Non-Provisional Application having Ser. No. 12/692,494, which was filed on Jan. 22, 2010, is hereby incorporated by reference herein. A United States Provisional Application filed on Jul. 26, 2007 and having Ser. No. 60/952,210 is hereby incorporated by reference herein.

The prior art apparatus of FIGS. 1A, 1B, 1C, and 1D, does not permit variations of a feed formulation. What is needed is a mobile apparatus that can provide a plurality of feed formulations at a plurality of feeding locations.

Applicants' apparatus, and method using that apparatus, provides a plurality of feed formulations at a plurality of feeding locations, logs the actual amounts and formulations provided, and optionally generates an alert if an actual delivered quantity differs from a pre-set target quantity, and/or if an actual delivered feed formulation differs from a pre-set target feed formulation.

Applicants' apparatus can be disposed on either the exterior or interior of a prior art feed trailer 105. In the alternative, Applicants' apparatus can be incorporated into a new article of manufacture.

Figure 2A:
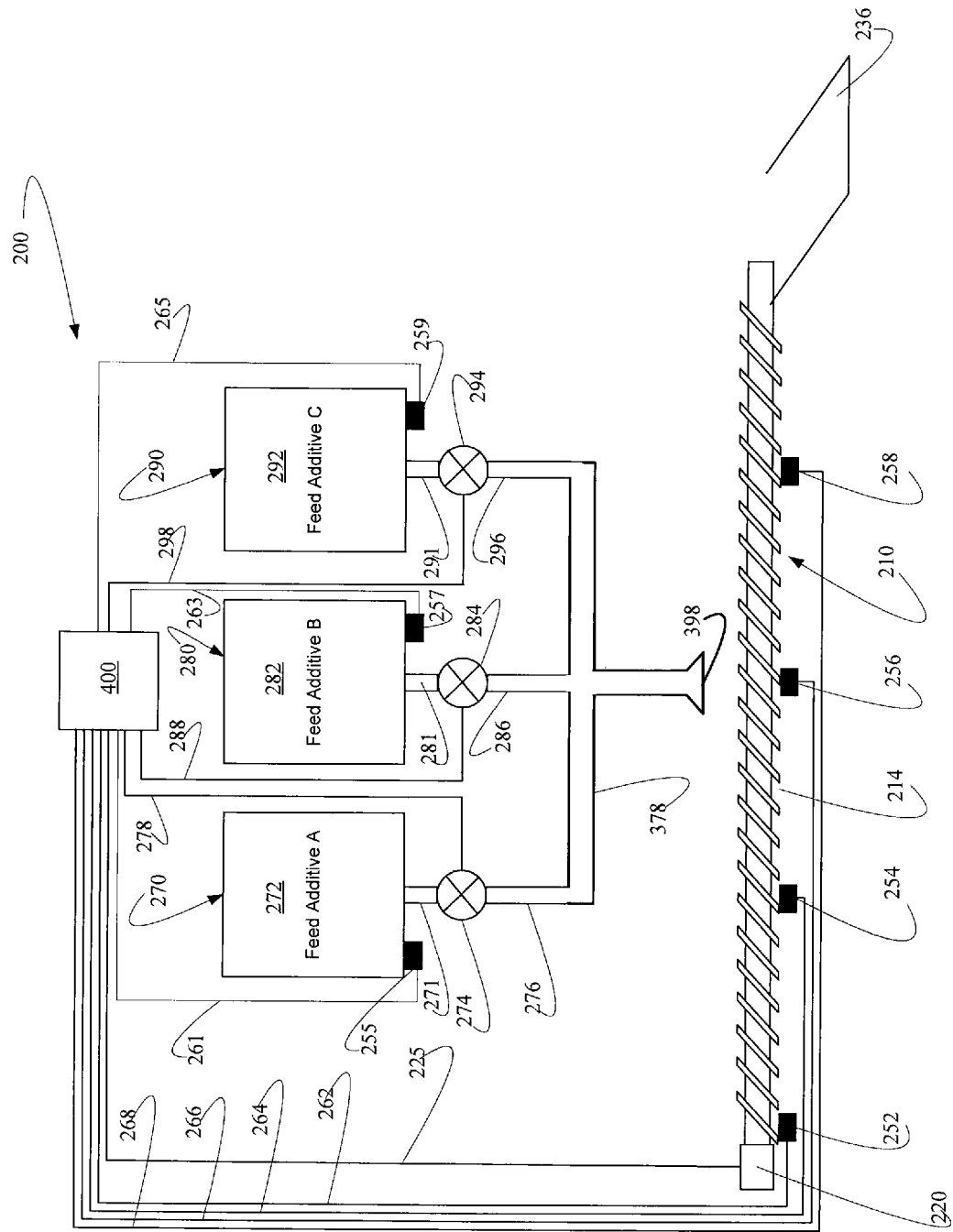
FIG. 2A schematically depicts one embodiment of Applicants' feed preparation apparatus.

FIG. 2A illustrates Applicants' assembly 200. In the illustrated embodiment of FIG. 2A, Applicants' assembly 200 comprises auger assembly 210, motor 220, a first measurement device 252, second measurement device 254, third measurement device 256, fourth measurement device 258, fifth measurement device 255, sixth measurement device 257, seventh measurement device 259, first feed additive assembly 270, second feed additive assembly 280, third feed additive assembly 290, feed additive manifold 378, spray assembly 398, and controller 400.

Auger assembly 210 conveys feed 150 to the vicinity of spray assembly 398, wherein one or more of Feed Additive "A", and/or Feed Additive "B", and/or Feed Additive "C," are sprayed onto feed 150. Feed 150, having been treated with one or more of Feed Additive "A", and/or Feed Additive "B", and/or Feed Additive "C," is then dropped into exit chute 236 extending outwardly from Applicants' mobile feed preparation apparatus. In certain embodiments, Feed Additives A, B, and C, are selected from the group consisting of a beta-agonist, a vitamin, a parasiticide, an antibiotic, a probiotic, a growth promoter, an estrus suppressant, an ionophore, a microbial, an antimicrobial, a nutritional supplement, a larvicide, a mineral, any other feed supplement, or any combination thereof. Motor 220 is interconnected with, and controlled by, controller 400 via communication link 225.

In the illustrated embodiment of FIG. 2A feed additive assembly 270 comprises conduit 271, reservoir 272, valve 274, conduit 276, and communication link 278. Conduit 276 interconnects valve 274 and feed additive manifold 378. Communication link 278 interconnects valve 274 and controller 400. In certain embodiments, valve 274 comprises a totalizer, wherein that totalizer determines the amount, either in weight or volume, of Feed Additive Composition A passing through valve 274. In these embodiments, the amount of Feed Additive Composition A added to the feed is communicated to controller 400 via communication link 278.

Feed additive assembly 280 comprises conduit 281, reservoir 282, valve 284, conduit 286, and communication link 288. Conduit 286 interconnects valve 284 and feed additive manifold 378. Communication link 288 interconnects valve 284 and controller 400. In certain embodiments, valve 284 comprises a totalizer, wherein that totalizer determines the amount, either in weight or volume, of Feed Additive Composition B passing through valve 284. In these embodiments, the amount of Feed Additive Composition B added to the feed is communicated to controller 400 via communication link 288.

Feed additive assembly 290 comprises conduit 291, reservoir 292, valve 294, conduit 296, and communication link 298. Conduit 296 interconnects valve 294 and feed additive manifold 378. Communication link 298 interconnects valve 294 and controller 400. In certain embodiments, valve 294 comprises a totalizer, wherein that totalizer determines the amount, either in weight or volume, of Feed Additive Composition C passing through valve 294. In these embodiments, the amount of Feed Additive Composition C added to the feed is communicated to controller 400 via communication link 298.

Conduits 276, 286, and 296, interconnect with feed additive manifold 378. Spray assembly 398 is attached to one end of feed additive manifold 378. FIG. 8 depicts an embodiment of spray assembly 398. Turning to FIG. 8, in certain embodiments, spray assembly 398 comprises main input 360 and sub inputs 362A, 362B, and 362C. In such embodiments, a feed additive may be mixed with water or one or more other liquids or solids within spray assembly 398 and are sprayed on the feed base. In such embodiments, the feed additive may be a liquid or a solid and may be injected into an air stream and then input into to spay assembly 398 via main input 360 or one of sub inputs 362A, 362B, or 362C. Water, one or more other liquids or solids, or another additive may also input into spray assembly 398 via main input 360 or one of sub inputs 362A, 362B, or 362C. Spray assembly 398 then sprays the resulting mixture onto a base feed.

In certain embodiments, base 366 of spray assembly 398 is veined, as illustrated by veins 364A, 364B, and 364C, to assist in directing the spray of the feed additive mixture as it leaves spray assembly 398. In certain embodiments, spray assembly 398 further comprises rubber flap 368 to further direct the spray of the feed additive mixture and to spread out the feed base such that it is evenly sprayed with the feed additive mixture.

Returning to FIG. 2A, in certain embodiments, valves 274, 284, and 294, comprise computer operable proportional valves, shutoff valves, and discharge flow meters located inline with conduits 276, 286, and 296, to regulate the dispensing rate and measure the amount of feed additive composition dispersed.

In certain embodiments, valves 274, 284, and 294, each comprises a feed screw, such as and without limitation an auger as described hereinbelow, to feed or meter out the feed additive composition. In such embodiments, the rate at which the feed additive is dispensed can be adjusted by adjusting the feed screw speed. In certain embodiments, the feed screw speed comprises a rate of rotation. In certain embodiments, the feed screw speed comprises a rate of movement of a powder/particles over a defined time interval.

In certain embodiments, feed additive assemblies 270, 280, and 290 further may be mounted on one or more load cells for the purpose of feeding via loss-of-weight methods or for calibration of feed rate speed for metering of feed additives.

Figure 2B:
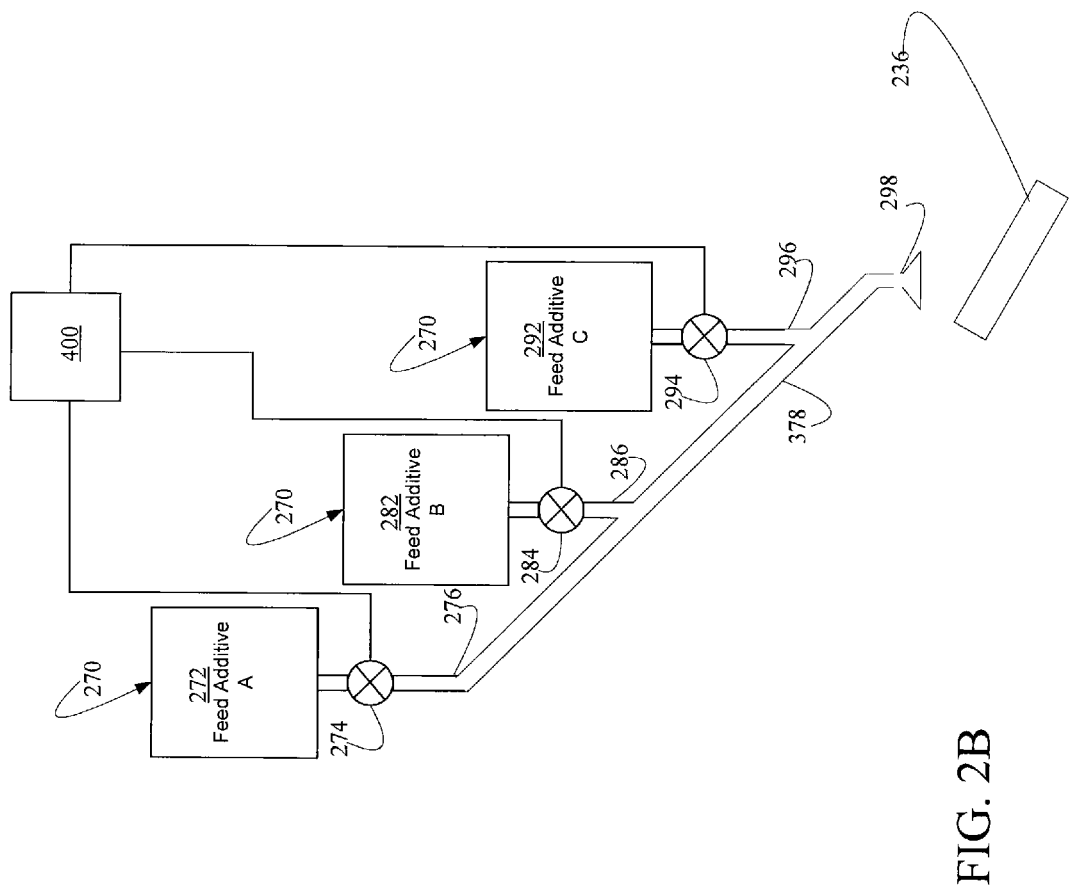
FIG. 2B schematically depicts a second embodiment of Applicants' feed preparation apparatus.

Referring now to FIG. 2B, in certain applications the feed additive or feed additive suspension is sprayed directly onto feed 150 as feed 150 exits the Applicants' mobile feed preparation apparatus via exit chute 236. In certain embodiments, the feed 150 in combination with one or more feed additives falls from a distal end of exit chute 236 and into a feed bunk.

Figure 2C:
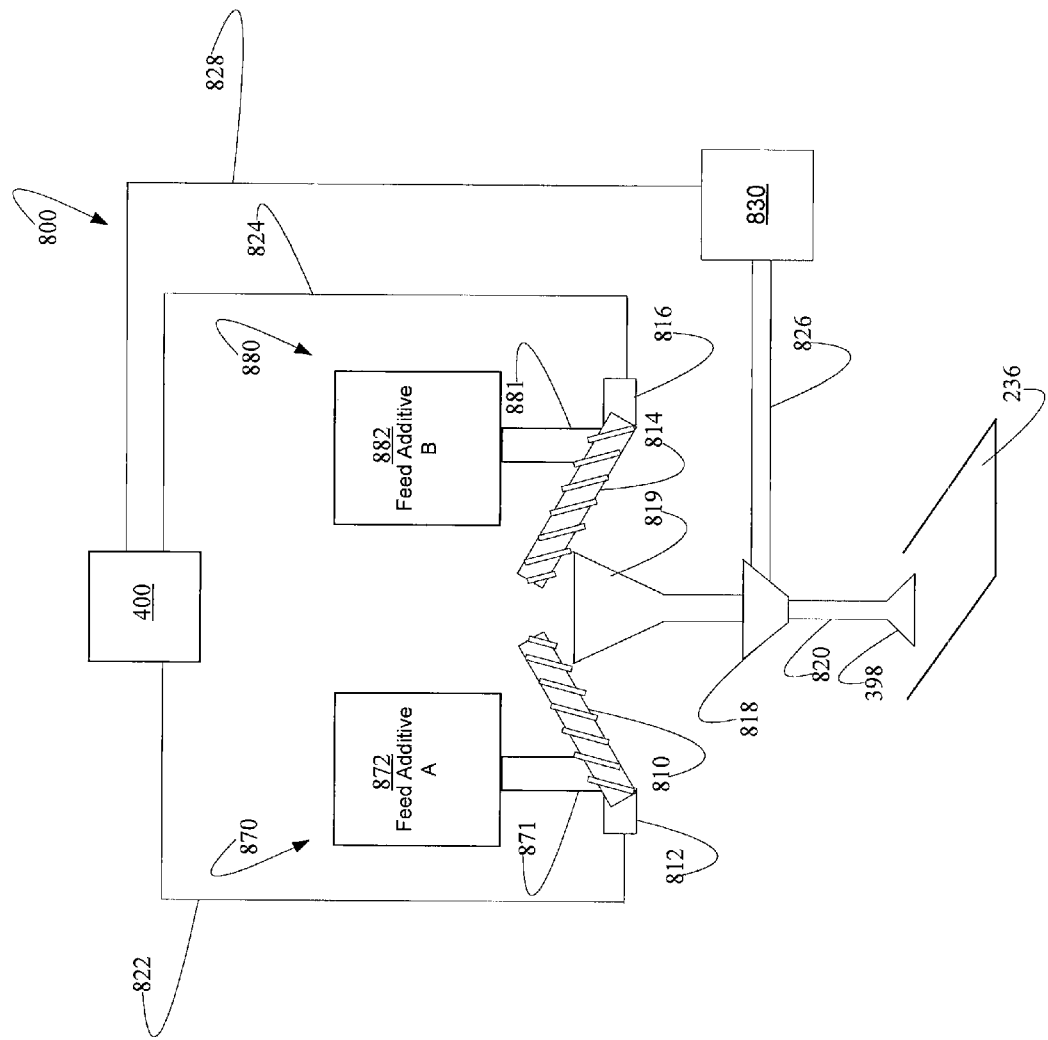
FIG. 2C schematically depicts a third embodiment of Applicants' feed preparation apparatus.

Turning now to FIG. 2C, in certain embodiments, one or more of the feed additive assemblies, such as feed additive assembly 870 and feed additive assembly 880, dispense only dry feed additives. In such embodiments, Applicants' assembly 800 may comprise feed additive assembly 870, feed additive assembly 880, discharge assembly 830, funnel 819, eductor 818, discharge line 820, spray assembly 398, and controller 400.

In the illustrated embodiment of FIG. 2C, feed additive assembly 870 comprises reservoir 872, conduit 871, motor 812, auger 810, and communication link 822. Communication link 822 interconnects motor 812 and controller 400. In these embodiments, feed additive exiting reservoir 872 via conduit 871 is transported via auger 810 to funnel 819, which dispenses the feed additive into eductor 818. In certain embodiments, auger 810 is at an incline. In certain embodiments, the incline is less than 90 (ninety) degrees. In certain embodiments, the incline is less than 45 (forty-five) degrees. At certain embodiments, the incline is between 10 (ten) degrees and (forty-five) degrees. At certain embodiments, the incline is between 20 (twenty) degrees and 25 (twenty-five) degrees. As will be appreciated by one of ordinary skill in the art, by having auger 810 at an incline, Applicants assembly 800 prevents the unwanted feeding of a feed additive due to vibration or movement of Applicants' mobile feed preparation apparatus.

Similarly, feed additive assembly 880 comprises reservoir 882, conduit 881, motor 816, auger 814, and communication link 824. Communication link 824 interconnects motor 816 and controller 400. In these embodiments, feed additive exiting reservoir 882 via conduit 881 is transported via auger 814 to funnel 819, which dispenses the feed additive into eductor 818. As also with auger 810, in certain embodiments, auger 814 is at an incline. In certain embodiments, the incline is less than 90 (ninety) degrees. In certain embodiments, the incline is less than 45 (forty-five) degrees. At certain embodiments, the incline is between 10 (ten) degrees and (forty-five) degrees. At certain embodiments, the incline is between 20 (twenty) degrees and 25 (twenty-five) degrees. As will be appreciated by one of ordinary skill in the art, by having auger 810 at an incline, Applicants assembly 800 prevents the unwanted feeding of a feed additive due to vibration or movement of Applicants' mobile feed preparation apparatus.

As will be appreciated by one of ordinary skill in the art, while FIG. 2C depicts auger 810 and auger 814 transporting feed additives to funnel 819 which then dispenses into a single eductor, eductor 818, in other embodiments, auger 810 and auger 814 may transport feed to separate eductors. In such embodiments, after passing through the separate eductors, the feed additives may be combined prior to spray assembly 398. In other embodiments, the feed additives may be combined within spray assembly 398. In such embodiments, feed from a first eductor may flow into, for example, one of main input 360 or sub input 362A, 362B, or 362C (FIG. 8) while feed from a second eductor flows into another input 360 or sub input 362A, 362B, or 362C.

In certain embodiments, the speed and timing of auger 810 and/or auger 814 is controlled by controller 400. As will be appreciated by one of ordinary skill in the art, the amount of feed additive delivered can be determined by the rate and time interval over which auger 810 and/or auger 814 dispenses a feed additive into eductor 818. In certain embodiments, an auger speed comprises a rate of rotation. In certain embodiments, an auger speed comprises a rate of movement of a powder/particles over a defined time interval. As those skilled in the art will appreciate, an auger dispensing rate is directly proportional to an auger speed.

A pressurized carrier, being either a fluid or a gas, discharged from discharge assembly 830 enters eductor 818 via conduit 826 and transports the feed additive through discharge line 820 and spray assembly 398. Communication link 826 interconnects controller 400 and discharge assembly 830, wherein controller 400 controls the flow of a pressurized carrier from discharge assembly 830 to eductor 818 via conduit 826.

Figure 6:
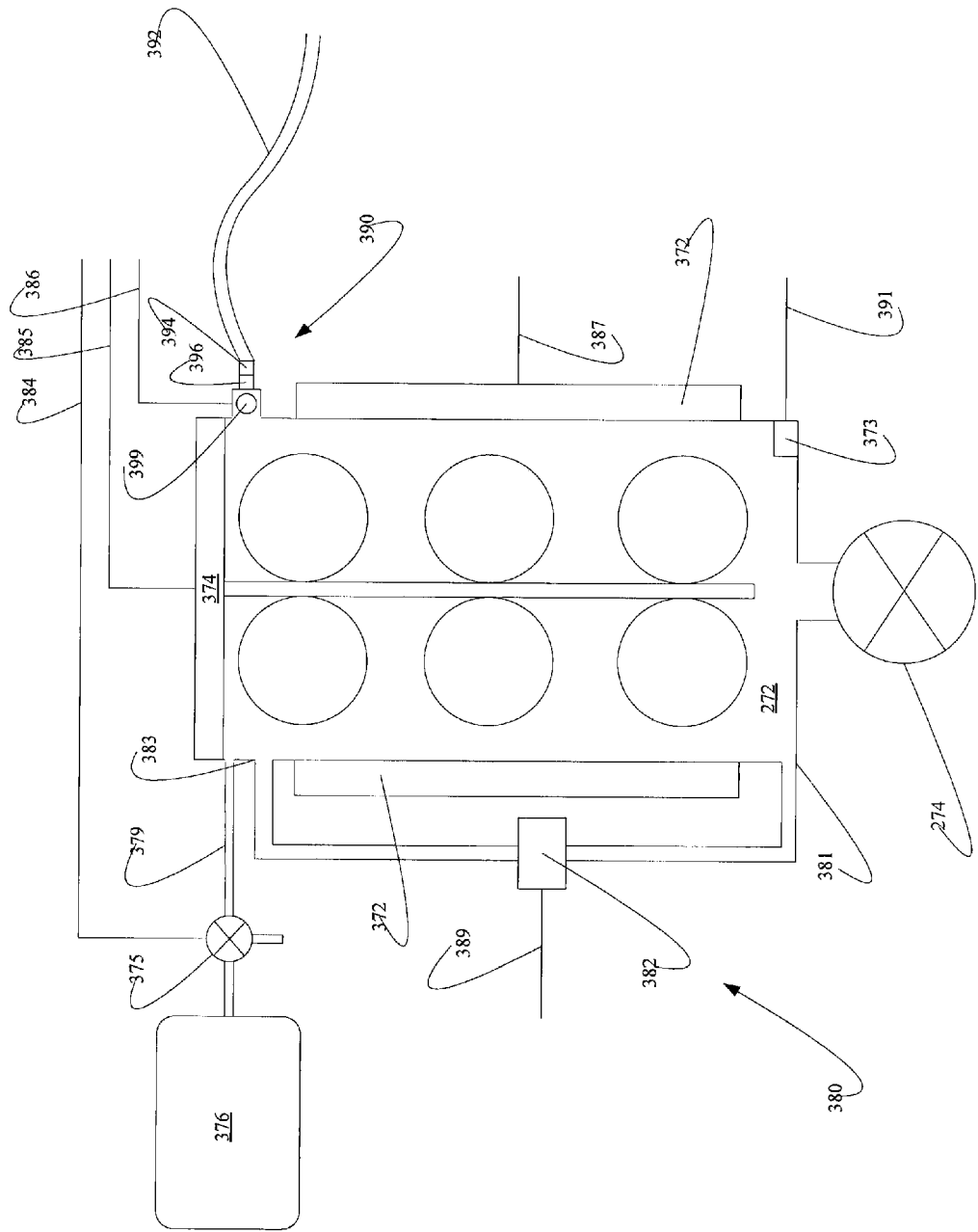
FIG. 6 is a block diagram showing additional components of one or more feed additive assemblies disposed in the feed preparation apparatus of FIG. 2A or FIG. 2B.

Referring now to FIG. 6, in certain embodiments, one or more of feed additive assemblies 270, 280, and/or 290, further comprises heater assembly 372, agitator assembly 374, pressurized air reservoir 376, recirculation assembly 380, and feed additive inlet assembly 390. The elements of feed additive assembly 270 illustrated in FIG. 6 may be implemented within any one of feed additive assemblies 270, 280 and/or 290 or feed additive assemblies 870 and/or 880.

In certain embodiments, heater assembly 372 comprises a heating tape. In certain embodiments, heater assembly 372 comprises liquid-filled heating tubes or lines. In certain embodiments, heater assembly 372 comprises heating tape, and/or heating tubes, disposed within a thermally insulating blanket or material. In certain embodiments, heater assembly 372 comprises an agent added to a feed additive, a feed additive composition, or a feed ingredient, where that agent depresses the freezing point of the feed additive, feed additive composition, or feed ingredient.

In the illustrated embodiment of FIG. 6, thermocouple 373 is disposed within reservoir 272. Communication link 391 interconnects thermocouple 373 and controller 400. In certain embodiments, controller 400 adjusts the heat supplied by heater assembly 372 based upon a temperature reported to controller 400 by thermocouple 373. In certain embodiments, the heat is adjusted by controller 400 adjusting the current provided to one or more heating tapes disposed within heater assembly 372.

In certain embodiments, heater assembly 372 is activated to prevent a feed additive composition disposed within reservoir 272 from solidifying in sub-freezing weather. In other embodiments, heater assembly 372 is used to reduce the viscosity of a feed additive composition disposed in reservoir 272. As those skilled in the art will appreciate, the temperature dependence of viscosity can be complicated because many factors enter into determining the viscosity of a material or a solution. However, over small temperature intervals, from about 0 degrees Celsius to about 60 degrees Celsius, plots of log (viscosity) vs. temperature in degrees Celsius are nearly linear, where viscosity is expressed in centipoise.

As an example and without limitation, in certain embodiments Applicants' feed additive composition comprises an aqueous solution/suspension/emulsion having a viscosity of between about 1 to about 5 centipoise. A feed additive composition comprising such a low viscosity is readily sprayable through spray assembly 398. However, that feed additive composition might run off/drip off a feed 150, and therefore, not be effectively administered to livestock.

A thickening agent can be added to the afore-described 1-5 centipoise aqueous feed additive composition to increase the viscosity. In certain embodiments, Applicants' feed additive composition comprises a viscosity of between about 150 to about 200 centipoise (consistency of maple syrup). Such a 150 to 200 centipoise feed additive composition adheres well to a base feed 150, however a rate of application of a 200 centipoise feed additive composition through spray assembly 398, might not be optimal. In certain embodiments, Applicants' apparatus and method heats a 200 centipoise feed additive composition to lower its viscosity. That heated feed additive composition is more readily dispensed through spray assembly 398, than is the ambient-temperature feed additive composition. When the sprayed feed additive composition contacts the ambient-temperature feed 150, the feed additive composition rapidly cools to ambient temperature and thickens, and as a result adheres well to base feed 150 to form a uniform base feed/additive composition.

In certain embodiments, one or more feed additive assemblies 270, 280, and/or 290, further comprises feed additive inlet assembly 390. In the illustrated embodiment of FIG. 6, feed additive inlet assembly comprises coupling 396 and inlet pressure sensor/gauge 399. In certain embodiments, inlet pressure sensor/gauge 399 indicates the pressure in feed additive input hose 392 is being used to convey a feed additive from an external tank into feed additive reservoir 272 via feed additive inlet assembly 390. In certain embodiments, inlet pressure sensor/gauge 399 is interconnected to controller 400 via communication link 386.

Coupling 396 can releasably mate with coupling 394 disposed on a distal end of feed additive input hose 392. In certain embodiments, coupling 394 comprises an automatic cutoff valve, wherein that cutoff valve closes if feed additive input hose 392 is pressurized and coupling 394 separates from coupling 396. In certain embodiments, a unique coupling combination 394/396 is used for each different feed additive assembly 270, 280, and 290, such that a feed additive formulated in a facility/tank external to Applicants' feed truck assembly and selected for input into feed additive assembly 270 cannot be introduced into feed additive assembly 280 or feed additive 290. Similarly, a feed additive formulated in a facility/tank external to Applicants' feed truck assembly and selected for input into feed additive assembly 280 cannot be introduced into feed additive assembly 270 or feed additive 290, and a feed additive formulated in a facility/tank external to Applicants' feed truck assembly and selected for input into feed additive assembly 290 cannot be introduced into feed additive assembly 270 or feed additive assembly 280.

In certain embodiments, feed additive assemblies 270, 280, and 290 further comprise a pump to discharge a feed additive composition from reservoirs 272, 282, and 292. In certain embodiments, feed additive reservoirs 272, 282, and 292 are pressurized such that a feed additive composition is dispensed under pressure via a spray assembly 398. In certain embodiments, mobile feed preparation apparatus further comprises a pressurized air reservoir 376, wherein that pressurized air reservoir 376 is interconnected to a feed additive reservoir, such as feed additive reservoir 272, via conduit 379 and regulator/relief valve 375. In certain embodiments, regulator/relief valve 375 is in communication with controller 400 via communication link 384. Controller 400 can cause regulator/relief valve 375 valve to release air pressure within reservoirs 272, 282, and/or 292 for feed additive refilling.

A feed additive composition that is not soluble in a liquid carrier comprises a suspension or emulsion. Such a suspension/emulsion may "settle," or "separate," respectively, prior to being dispensed onto a base feed. Continuously or periodically agitating/mixing such a suspension/emulsion as necessary will ensure the correct mix ratio.

In certain embodiments, feed additive assemblies 270, 280, and 290 further comprise an agitator assembly 374. In certain embodiments, agitator assembly 374 comprises a motor interconnected to a mixer disposed within reservoir 272. In certain embodiments, agitator assembly 374 comprises an ultrasonic mixing device.

In certain embodiments, a recirculation pump may be used, where the pump can be reversed or the valves redirected to force the suspension to flow through the dispensing lines to prevent the suspension from settling in the lines. In the illustrated embodiment of FIG. 6, recirculation output port is connected to recirculation input port 383 via recirculation pump 382 as necessary. Recirculation pump is interconnected to controller 400 via communication link 389. Controller 400 can activate recirculation pump 382 to circulate the contents of feed additive reservoir 272 outwardly from recirculation output port 381, through pump 382, and back into feed additive reservoir 272 via recirculation input port 383.

In certain embodiments, a pump and a series of valves is used to agitate the feed additive composition. In such embodiments a priority proportional divider valve routes the flow of the feed additive composition back into a reservoir, such as reservoir 272, 282, or 292, for agitation and the desired dispensing flow is bled off the main flow as required to dispense the feed additive composition. In other embodiments, multiple proportional valves are used, where the valves are set up to behave as a divider.

As those skilled in the art will appreciate, the viscosity of a Newtonian fluid is dependent only on temperature but not on shear rate and time. Examples of such Newtonian fluids include water, milk, sugar solutions, and mineral oil. On the other hand, the viscosity of a Non-Newtonian fluid is dependent on temperature, shear rate, and time. Many of Applicants' feed additive compositions comprise shear thinning, Non-Newtonian fluids, wherein the viscosity decreases with increased shear rate. In certain embodiments, Applicants' apparatus and method heats a feed additive composition to a temperature above the ambient temperature to modify its viscosity to optimize both sprayability and adherence to feed is described hereinabove.

As also described hereinabove, in certain embodiments Applicants' agitator assembly 374 comprises a motor interconnected to a mixer disposed within reservoir 272. In these embodiments, Applicants' apparatus and method applies a shear force to a feed additive composition to lower the viscosity of that feed additive composition, and sprays that reduced-viscosity feed additive composition onto feed 150 using spray assembly 398. In certain embodiments, Applicants' method utilizes both heat and shear rate to adjust the viscosity of a feed additive composition to optimize both sprayability and adherence of that feed additive composition.

Figure 3:
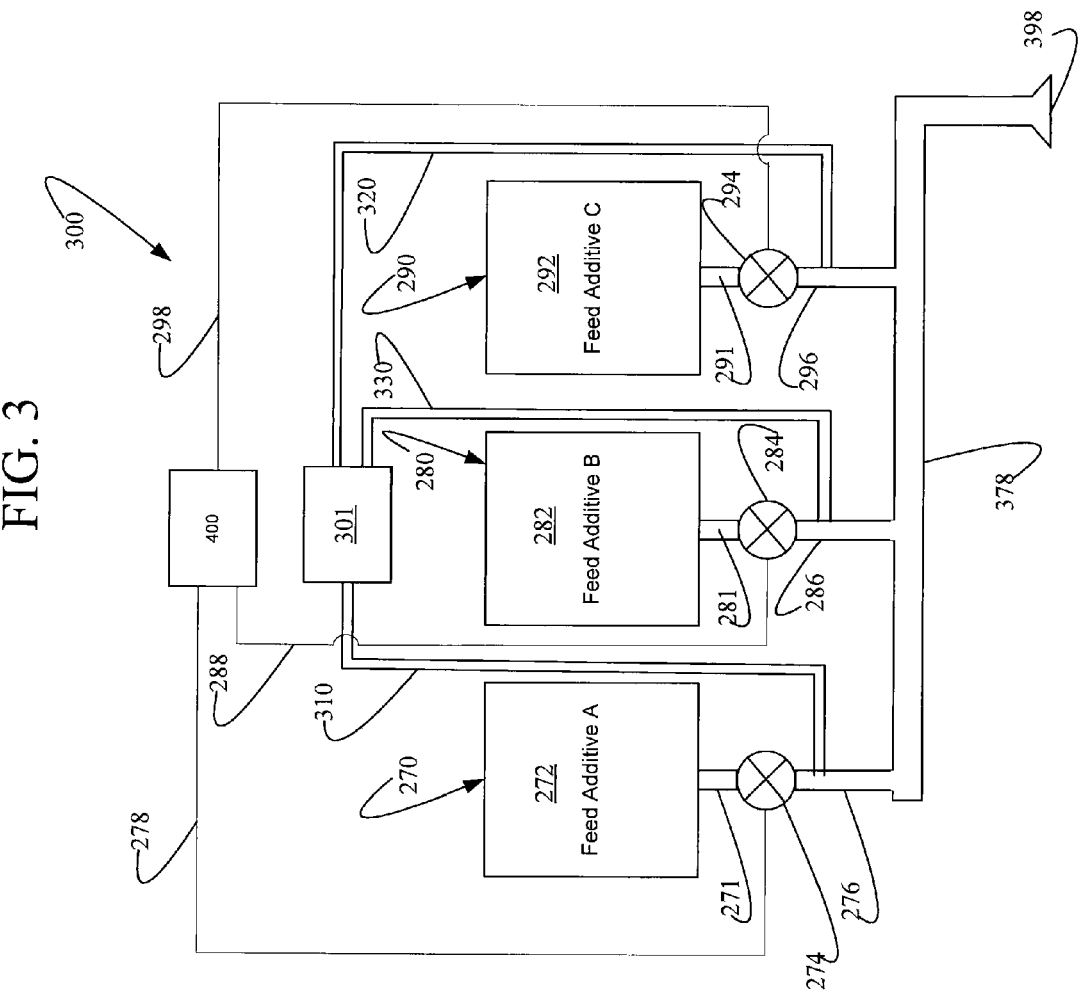
FIG. 3 illustrates a pressurized discharge unit embodiment of Applicants' feed preparation apparatus.

In the illustrated embodiment of FIGS. 2A, 2B, and 3, Applicants' apparatus comprises three feed additive assemblies and in FIG. 2C, Applicants' apparatus comprises two feed additive assemblies. In other embodiments, Applicants' apparatus comprises more than three feed additive assemblies. In still other embodiments, Applicants' apparatus comprises fewer than three feed additive assemblies.

In certain embodiments, mixing assembly 210 is mounted on a weight-sensitive platform equipped with a weigh cell 252. In these embodiments, the weigh cell output is integrated over short time intervals to give a rate of flow and total flow.

In certain embodiments, measurement device 252 comprises a Doppler flow meter. Doppler flow meters emit ultrasonic signals into a flow path. To use the Doppler effect to measure flow in a pipe, one transducer transmits an ultrasonic beam into the mixing assembly 210. The movement of materials alters the frequency of the beam reflected onto a second, receiving transducer. The frequency shift is linearly proportional to the rate of flow of materials, and therefore, can be used to develop an analog or digital signal proportional to flow rate.

In certain embodiments, mixing assembly 210 or feed additive assembly 270, 280, and 290 is/are mounted on one or more damped load cells. The damped load cell reduces some of the vibrations and load cell 'ringing' caused by the moving vehicle and engine vibration. In certain embodiments, the damped load cell is further mounted to a bracket attached to the delivery vehicle using vibration isolation mounts or any other type of mounts to counteract vibrations caused by the moving vehicle and engine vibration. In certain embodiments, one or more accelerometers or motion detectors are mounted on mixing assembly 210 or feed additive assembly 270/280/290 or other suitable location to detect motion in one or more directions. In certain embodiments, a gyroscope is employed to monitor rotational movement and make any necessary corrections. In certain embodiments, mixing assembly 210 is further affixed to a gimbal mount to counteract the effects of motion on the scale.

In certain embodiments, measurement device 252 comprises weigh belts. In certain embodiments, measurement device 252 comprises a mass flow meter incorporating ultrasonic signals, scintillation counters, or any other type of flow measurement sensing equipment, or combination thereof. In certain embodiments, measurement device 252 comprises pressure transducers to measure weight or force.

In certain embodiments, measurement device 252 is further capable of transmitting a current scale weight to controller 400. In such embodiments, measurement device 252 may comprise a wireless communication module, such as WI-FI, and may wirelessly transmit the current scale weight to controller 400 for monitoring.

In certain embodiments, sensory information from devices such as accelerometers, gyro meters, motion detectors, etc. as previously described is used to determine whether weight measurements are accurate enough for use or sensory information can be used to correct weight measurements for feed additives or for the feed container 110 where the feed container 110 is mounted on load cells. In such embodiments, controller 400 may use the sensory information to determine the mass of the amount distributed. In other such embodiments, controller 400 uses weight calculation equations created using regression analysis techniques to produce one or more regression equations. In other embodiments, controller 400 uses artificial intelligence techniques to correct the scale weight received. These correction techniques also apply to weight measurements taken in other locations, for example, in the previously described embodiment where the feed additive assembly 270/280/290 is mounted on one or more load cells or in the case where feed container 110 is mounted on load cells.

In the illustrated embodiment of FIG. 2A, mixing assembly 210 is further mounted on a weight-sensitive platform equipped with a weigh cells 254, 256, and 258. In these embodiments, each weigh cell output is integrated over short time intervals to give a rate of flow and total flow.

In certain embodiments, weigh cells 254, 256, and 258 comprise Doppler flow meters. Doppler flow meters emit ultrasonic signals into a flow path. To use the Doppler effect to measure flow in a pipe, one transducer transmits an ultrasonic beam into the mixing assembly 210. The movement of materials alters the frequency of the beam reflected onto a second, receiving transducer. The frequency shift is linearly proportional to the rate of flow of materials, and therefore, can be used to develop an analog or digital signal proportional to flow rate.

In the illustrated embodiment of FIG. 2A, in certain embodiments reservoirs 272, 282, and 292 are further mounted on weight sensitive platforms equipped with weigh cells 255, 257, and 259. In such embodiments, the amount of feed additive in reservoirs 171, 282, and 292 can be measured using weigh cells 255, 257, and 259. In such embodiments, controller 400 is in communication with weigh cells 255, 257, and 259 via communication links 261, 263, and 265, respectively.

Figure 9:
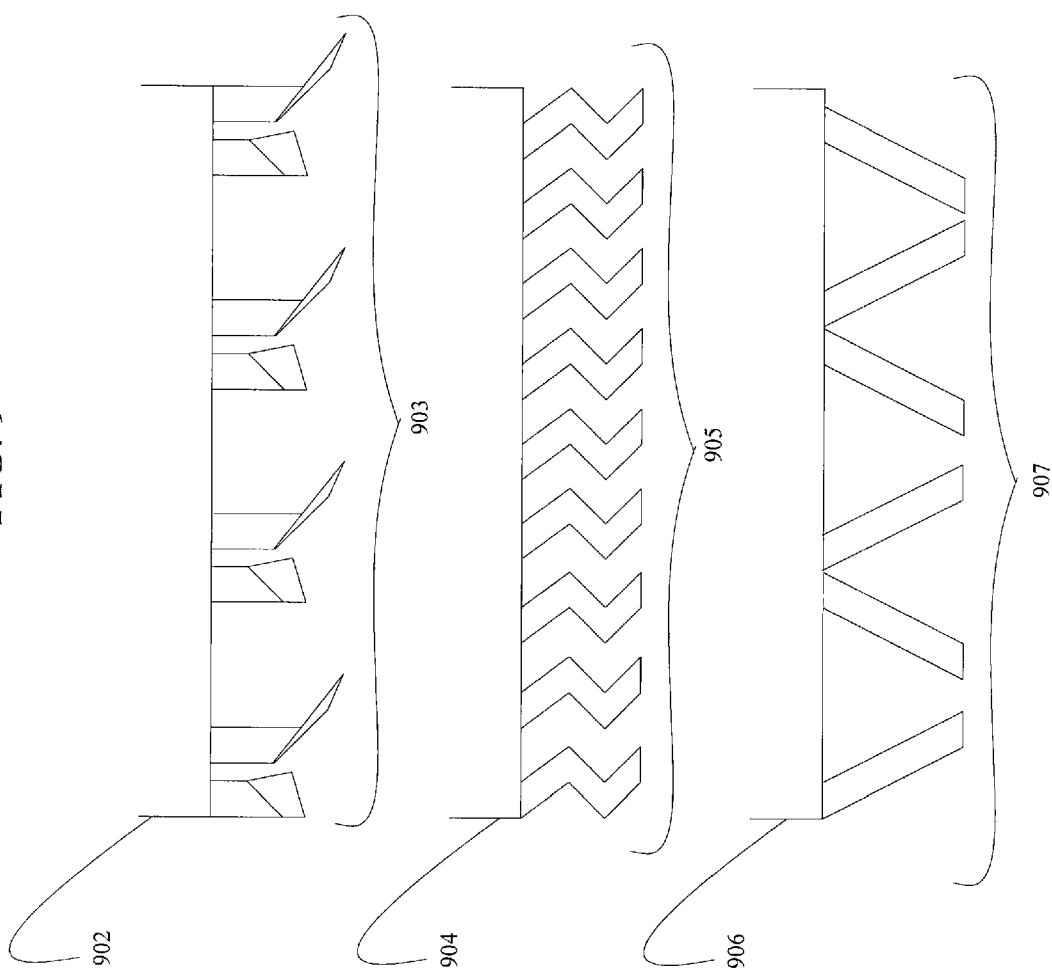
FIG. 9 depicts an embodiment of a static mixer assembly of Applicants' feed preparation apparatus.

Turning to FIG. 9, in certain embodiments, Applicants' mobile feed preparation apparatus further comprises a static mixer, such as static mixer 902, 904, and/or 906, disposed on the end of exit chute 236. In such embodiments, teeth 903, 905, and/or 907 of static mixer 902, 904, and/or 906, respectively, mixes feed 150 and one or more feed additives disposed on feed 150 via spray assembly 398 as feed 150 and the one or more feed additives exits Applicants' mobile feed preparation apparatus via exit chute 236.

As will be appreciated by one of ordinary skill in the art, the various orientations of teeth 904, 905, and 907 of static mixers 902, 904, and/or 906 depicted in FIG. 9 are meant to be illustrative and not limiting. Applicants' invention is broad enough to encompass any configuration of teeth 904, 905, and 906 capable of mixing a feed and a feed additive sprayed thereon as the feed travels down a chute.

In other embodiments, other types of agitators, both passive and/or active, may be disposed on the end of exit chute 236 such as, and without limitation, a ribbon mixer, a paddle mixer, or a combination paddle-ribbon mixer. As will be appreciated by one of ordinary skill in the art, paddle, ribbon, and combination paddle-ribbon mixers are horizontal mixers comprising paddles or blades attached to a horizontal rotor. In yet other embodiments, an axle with pegs or other protrusions may be disposed on the end of exit chute 236. In such embodiments, the axle may be passive or active.

Figure 4:
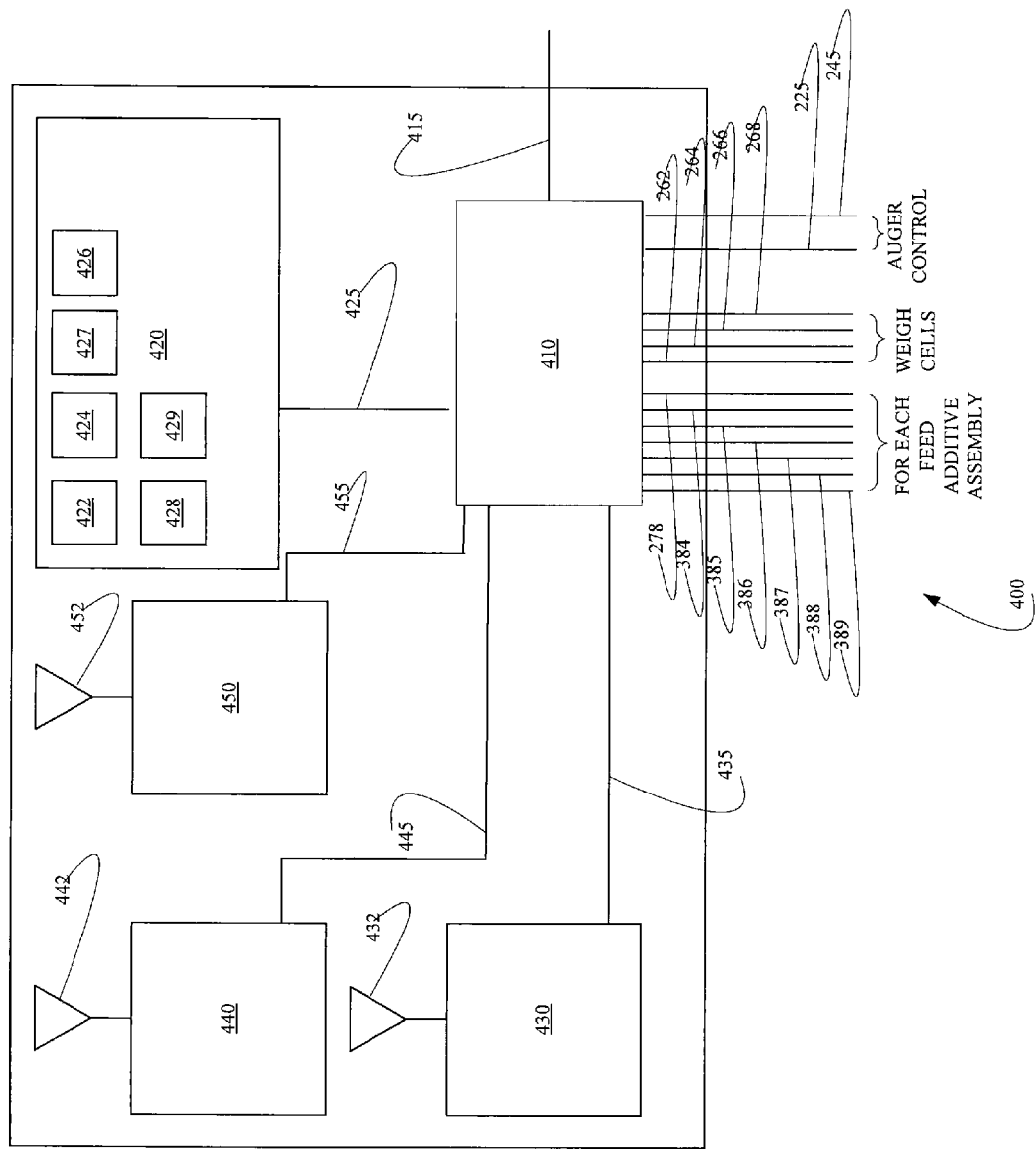
FIG. 4 schematically depicts a controller of the invention.

Referring now to FIG. 4, controller 400 comprises processor 410, memory 420 interconnected with processor 410 via communication link 425, optional GPS module 430 interconnected with processor 410 via communication link 435, optional RFID module 440 interconnected with processor 410 via communication link 445, and optional wireless communication module 450 interconnected with processor 410 via communication link 455. By way of example and not limitation, wireless communication module 450 may utilize WI-FI, Blue Tooth, ZIGBEE® (a wireless communication protocol by ZigBee Alliance Corp.), RF communication protocol or any other wireless communication protocol.

As those skilled in the art will appreciate, GPS module 430 comprises a wireless device that receives a plurality of signals from a plurality of GPS satellites, and determines a location for the GPS device using that plurality of signals. As those skilled in the art will appreciate, wireless communications module 450 comprises a wireless network permitting communication with one or more external computers or programmable devices in a network or with point-to-point communications.

In certain embodiments, processor 410 is interconnected by communication link 415 to an external data input device, such as and without limitation, a pointing device, mouse, key board, touch screen, and the like.

In the illustrated embodiment of FIG. 4, microcode 422, instructions 424, feed delivery database 426, feed additive and ration formulation database 427, feed additive inventory database 428, and feed cost database 429 are encoded in memory 420. In certain embodiments, memory 420 comprises non-volatile memory. In certain embodiments, memory 420 comprises battery backed up RAM, a magnetic hard disk assembly, an optical disk assembly, and/or electronic memory. By "electronic memory," Applicants mean a PROM, EPROM, EEPROM, SMARTMEDIA, FLASHMEDIA, and the like.

Processor 410 uses microcode 422 to operate controller 400. Processor 410 uses microcode 422, instructions 424, feed additive and ration formulation database 427 and feed delivery database 426 to operate GPS module 430, RFID module 440, wireless communications module 450, augers 130 and 140, auger assembly 210, motor 220, delivery assembly 230, measurement devices 252, 254, 256, and 258, and valves 274, 284, and 294.

A person of ordinary skill in the art will appreciate that controller 400 may comprise one or more computers, microcontrollers, microcomputers, programmable logic controllers (PLCs), or similar programmable devices in any or all combinations to implement the necessary programmable logic for Applicants' mobile feed preparation apparatus.

In certain embodiments, Applicants' invention further comprises a feed additive preparation station. As will be appreciated by one of ordinary skill in the art, accurately weighing and mixing small amounts of feed additive while Applicants' feed truck is in motion is difficult. Rather, in certain embodiments, feed additives are specially prepared at a feed additive preparation location prior to delivery and incorporation with feed using Applicants' mobile feed preparation mobile feed preparation apparatus. At the feed additive preparation area, feed additives can be accurately measured and mixed with a carrier to produce a feed additive composition having a known concentration and uniform consistency, which can then be loaded onto a feed truck for delivery. In certain embodiments, the feed additive preparation area is housed in near vicinity to the location where base feed 150 is loaded into Applicants' mobile feed preparation mobile feed preparation apparatus.

Figure 7A:
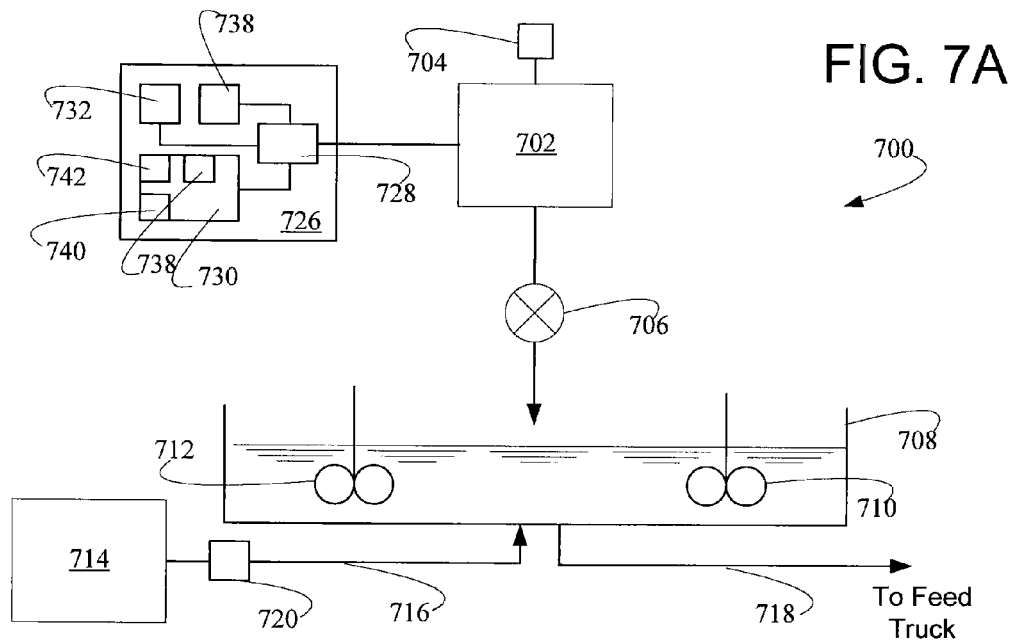
FIG. 7A is a block diagram of an exemplary feed additive preparation system according to Applicants' invention.

In the illustrated embodiment of FIG. 7A, feed additive preparation station 700 comprises a feed additive container 702 connected to a discharge gate 706 capable of discharging a feed additive into liquid suspension mixing tank 708 having a carrier 709 disposed therein. Container 702 contains feed additive, such as and without limitation, a beta-agonist, a vitamin, a parasiticide, an antibiotic, a probiotic, a growth promoter, an estrus suppressant, an ionophore, a microbial, an antimicrobial, a larvicide, a nutritional supplement, a mineral, any other feed supplement, or any combination thereof.

The feed additive may be in the form of a liquid, a solid in the form of a powder, granular, pelletized, crumbled, or any other solid form or combination thereof, a gel, or any combination thereof. In certain embodiments, the feed additive is an active ingredient. In certain embodiments, the feed additive is an inactive ingredient.

Feed additive preparation station 700 is described herein in terms of a single feed additive combined with a liquid carrier. Such a description should not be taken as limiting. In certain embodiments, one or more feed additives are combined with one or more liquid carriers to produce a feed additive composition. In such embodiments, feed additive preparation station 700 may comprise multiple feed additive containers each connected to a discharge gate and discharging into a single mixing tank. Furthermore, while the present invention is described in terms of a liquid carrier. Applicants' invention is not so limited. In certain embodiments, the carrier is a solid. In other embodiments, the carrier is gelatinous.

In certain embodiments, a feed additive, combination of feed additives, or carriers used, is selected to form and maintain homogeneity of the resulting composition. For example and without limitation, the stability of a suspension/emulsion during storage and pumping is considered in selecting a specific feed additive, combination of feed additives, and/or the carrier(s). In certain embodiments, other factors are considered in determining the specific feed additive, combination of feed additives, or carrier, such as and without limitation, minimizing viscosity changes with temperature, freezing point of the resulting suspension, resistance to degradation from environmental elements as well as microbial growth, palatability, toxicity, ease by which the resulting suspension can be cleaned and disposed of after a spill, FDA approval, solubility in water or fat, pH level, color, odor, traceability, or any other relevant factor, or combination thereof.

In certain embodiments, the feed additive is combined with a suspension agent and/or emulsifying agent to form a suspension/emulsion having improved handling and/or dispensing ability. In such embodiments the suspension/emulsion may comprise one or more wet or dry additives in combination with, without limitation, water, corn syrup, cane molasses, beet molasses, citrus molasses, honey, ketchup, milk, cream, yogurt, vegetable oils, fats, glycerol, alcohols, or any combination thereof. In other embodiments, the suspension/emulsion may further comprise thickening and/or suspension agents, such as and without limitation, guar gum, guar gum with borax, carrageenan, cellulose, agar, diutan gum, gellan gum, locust bean gum, microparticulated whey protein concentrate, pectin, welan gum, xanthan gum, bentonite clay, attapulgite clay, clay flocculating agents (i.e., ammonium polyphosphate), wheat flower, arrowroot, tapioca, starch, maltodextrin, synthetic polymers, or any other agent or combination thereof. In other embodiments, the suspension/emulsion may further comprise natural or synthetic lakes and dyes, natural or synthetic flavor or odor enhancers including, but not limited to, sweeteners such as sugars, aspartame, cyclamate, and saccharin, monosodium glutamate, flavors such as anise, caramel, licorice, etc., natural and synthetic emulsifiers, stabilizers including gelatin, wetting agents, pH adjusters such as organic and inorganic acids and bases, salts, and tracers. In certain embodiments, the suspension/emulsion further comprises a preservative, such as, and without limitation, benzoates such as sodium benzoate or benzoic acid, nitrites such as sodium nitrite, sulfites such as sulfur dioxide, or sorbates such as sodium sorbate or potassium sorbate.

In certain embodiments, the suspension agent, emulsifying agent, or carrier, includes propylene glycol, molasses, whey, a liquid protein supplement, or a viscosity modification agent. In certain embodiments, the suspension agent or carrier is a non-aqueous fluid, gelatinous-based, foam-based, solid, or air or another compressed gas. In certain embodiments, the suspension agent or carrier includes one or more nutritional or non-nutritional feed ingredients or combination of ingredients. In certain embodiments, a base feed 150, or partial base feed 150 with a high concentration of one or more feed additives is included for subsequent blending with base feed 150 without a feed additive or one with lower concentration of a feed additive, or a combination thereof to produce the required feed additive concentration.

In the illustrated embodiment of FIG. 7A, container 702 is interconnected with load cell 704 for inventory purposes, calibrating a metering device, or for feeding an ingredient using loss of weight techniques. In certain embodiments, load cell 704 is secured to a supporting frame.

In the illustrated embodiment of FIG. 7A, discharge gate 706 is mounted at the discharge opening of container 702. When discharge gate 706 is opened, feed additive from container 702 is added to liquid suspension mixing tank 708, having a carrier 709 disposed therein. In certain embodiments, discharge gate is automatically operable.

In certain embodiments, container 702 and discharge gate 706 are located above mixing tank 708 such that the feed additive can be gravity fed into mixing tank 708. In certain embodiments, the feed additive is a liquid. In such embodiments, a liquid pump may be employed to pump the liquid feed additive from container 702 into mixing tank 708. In such embodiments, a flow meter may be further employed to measure the amount of liquid feed additive pumped into mixing tank 708

In certain embodiments, prior to adding the feed additive from container 702 into mixing tank 708, a carrier is added to mixing tank 708 from a carrier container 714 attached via supply line 716. In certain embodiments where the carrier is a liquid, a flow meter, such as flow meter 720, may be used to ensure the proper amount of liquid carrier is added to mixing tank 708. In other embodiments, the carrier is measured by weight, by volumetric metering, by conveying for a period of time based at least in part on an actual or estimated flow rate, by determining weight of the feed additive used by loss in weight from container 702, by determining the increase in weight when added to a vessel either alone or along with another feed additive or feed ingredient, by volume whereby the feed additive or feed ingredient is added to a vessel of known volume or a vessel with graduations, or by determining the amount or volume using a level sensor or device using one or a multiple of devices including a photo-detection device, ultrasonic level measurement, capacitance, reflected sound device, or any other similar or dissimilar device used for such measurements, or combination thereof.

In certain embodiments, the liquid carrier comprises two or more different components. In such embodiments, each component may have its own liquid carrier container, flow meter, and supply line.

Before, during, or after, the liquid carrier is added to mixing tank 708, the feed additive from container 702 may be added to mixing tank 708 to produce the desired concentration. In certain embodiments, mixers 710 and 712 are active to ensure a proper mix of the feed additive and carrier. In certain embodiments, mixers 710 and 712 are rotating propellers, ribbon mixers, magnets, or any other form of physical mixing device, or combination thereof. In other embodiments, other means of mixing the liquid carrier with the feed additive may be employed, such as and without limitation, air or other gas blown into mixing tank 708 or a periodic or continuous recirculation of the feed additive composition.

In other embodiments, reservoirs 272, 282, and 292 (FIGS. 2A, 2B, 3), of feed additive assemblies 270, 280, and 290 (FIGS. 2A, 2B, 3), respectively, disposed in Applicants' mobile feed preparation mobile feed preparation apparatus, are specifically designed and/or constructed such that the motion of the mobile apparatus, while en route, provides sufficient agitation to mix a suspension emulsion, and/or keep the feed additive composition properly agitated.

Mixers 710 and 712 periodically agitate the feed additive composition as necessary during storage to ensure that one or more feed additives remain in suspension. In certain embodiments, the feed additive liquid suspension must be conveyed to mixing tank 708 for mixing. In certain embodiments, a feed additive liquid suspension is conveyed to a holding vessel for storage prior to loading into Applicants' mobile feed preparation mobile feed preparation apparatus. In other embodiments, a feed additive liquid suspension is loaded into Applicants' mobile feed preparation mobile feed preparation apparatus, without prior mixing or storage.

Figure 7B:
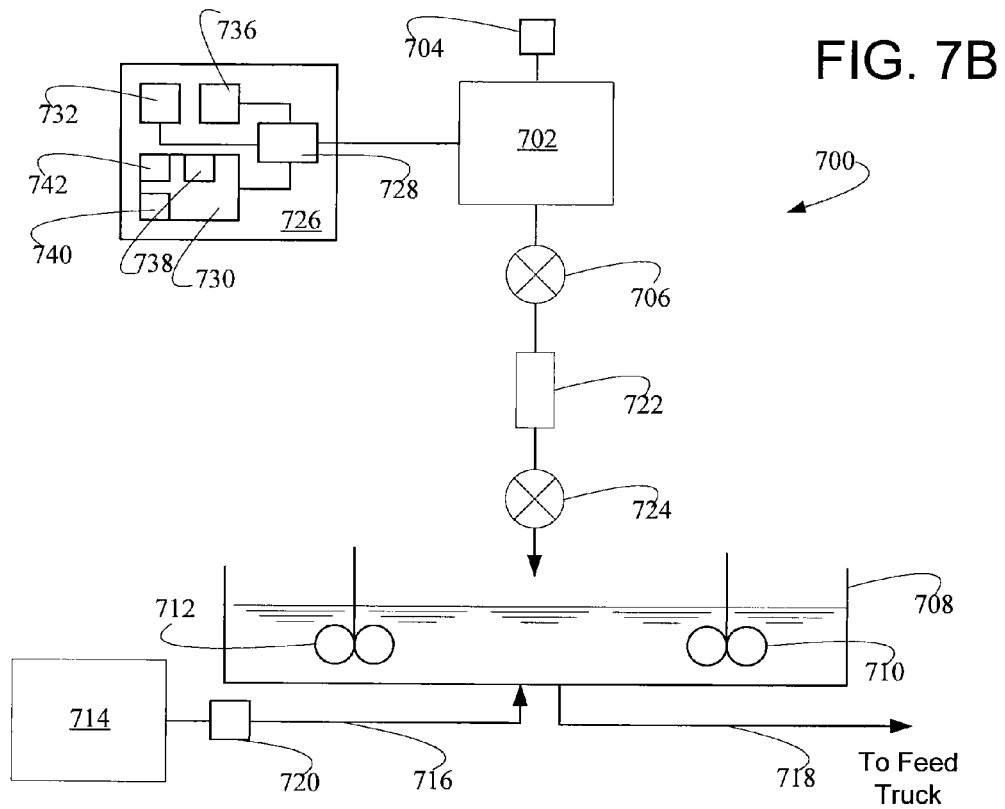
FIG. 7B is a block diagram of another exemplary feed additive preparation system according to Applicants' invention.

Turning to FIG. 7B, in certain embodiments, feed additive preparation station 700 further comprises weighing device 722 for weighing the amount of feed additive being added to mixing tank 708. In such embodiments, weighing device 722 may comprise a container mounted to a load cell. In such embodiments, the load cell may be a single point load cell. In certain embodiments, mounted below weighing device 722 may be a second discharge gate 724 to discharge the feed additive from weighing device 722 after it has been weighed.

In other embodiments, the feed additive is measured by volumetric metering, by conveying for a period of time based at least in part on an actual or estimated flow rate, by determining weight of the feed additive used by loss in weight from container 702, by determining the increase in weight when added to a vessel either alone or along with another feed additive or feed ingredient, by volume whereby the feed additive or feed ingredient is added to a vessel of known volume or a vessel with graduations, or by determining the amount or volume using a level sensor or device using one or a multiple of devices including a photo-detection device, ultrasonic level measurement, capacitance, reflected sound device, or any other similar or dissimilar device used for such measurements, or combination thereof.

In the illustrated embodiment of FIG. 7B, where the feed additive is a dry feed additive, discharge gate 706, weighing device 722, and discharge gate 724 which may be connected by a sleeve. The sleeve is used to contain the feed additive and/or dust while the additive is fed from container 702 or being discharged from weighing device 722 and made of a flexible material to isolate the weighing device 722 from other components. In certain embodiments, the sleeve is opaque. In other embodiments, the sleeve is clear to allow viewing of the additive as it is being discharged from container 702 or weighing device 722.

Where the feed additive is a liquid feed additive, in certain embodiments a liquid feed additive concentrate is injected directly into the liquid carrier flow while refilling a feed truck. Flow meters on both the liquid feed additive concentrate and the liquid carrier may be used to ensure the proper amount of each liquid component is pumped onto the feed truck during the refilling process.

Feed additive preparation station 700 is preferably housed adjacent to a feed truck load out area, the location where a feed ration is loaded into Applicants' mobile feed preparation mobile feed preparation apparatus. As will be appreciated by one of ordinary skill in the art, the configuration of a load out area is particular to a given feedyard and may comprise one or more finished feed bins, a surge bin following a scale or mixer, or simply a scale or a mixer that dumps directly into the feed truck. Some facilities may employ a front-end loader to load the feed ingredients directly into a mixer-type feed truck.

In certain embodiments, a feed additive preparation area may contain one or more feed additive preparation systems. Additionally, in certain embodiments the feed additive preparation area contains one or more of a water source, a pressurized water storage tank with a boost pump if the flow or pressure from the inlet line is not sufficient to supply the preparation process, an air compressor, feed truck feed additive recharge lines, automation and control equipment, and bulk ingredient storage areas.

In the illustrated embodiments of FIGS. 7A and 7B, Applicants' feed additive preparation station 700 further comprises controller 726 comprising processor 728, memory 730 interconnected with processor 728 via a communication link, optional wireless communications module 732 interconnected with processor 728 via a communication link, and external devices 736 such as, but without limitation, a display, keyboard, touch screen, mouse, indicators, operator controls, etc., interconnected with processor 728 via another communication link.

As those skilled in the art will appreciate, wireless communications module 732 comprises a wireless network communication module implementing a wireless communication protocol such as, and without limitation, WI-FI, BlueTooth, ZIGBEE® (a wireless communication protocol by ZigBee Alliance Corp.) RF, or any other such wireless communication protocol.

Microcode 738, instructions 740, and database 742, are encoded in memory 730. In certain embodiments, memory 730 comprises non-volatile memory. In certain embodiments, memory 730 comprises battery backed up RAM, a magnetic hard disc assembly, an optical disk assembly, and/or electronic memory. By "electronic memory," Applicants mean a PROM, EPROM, EEPROM, SMARTMEDIA, FLASHMEDIA, and the like.

Processor 728 uses microcode 738 and instructions 740 to operate controller 726. Processor 728 uses microcode 738, instructions 740, and database 742, to operate wireless communications module 732, peripherals 736, discharge gates 706 and 724, mixers 712 and 710, supply line 716, and discharge line 718.

In certain embodiments, controller 726 monitors the feed additive assemblies, and if the feed additive level in one or more of reservoirs 272, 282, and/or 292 (FIGS. 2A, 2B, 3), drops below a threshold value, controller 726 prepares one or more additional feed compositions. In certain embodiments, controller 726 determines an amount of the feed additive composition already prepared and waiting in mixing tank 708 and whether an additional amount needs to be prepared.

In operation, to refill a reservoir, such as reservoir 272, 282, or 292 (FIGS. 2A, 2B, 3) or such as reservoir 872 or 882 (FIG. 2C), of a feed additive assembly, such as feed additive assembly 270, 280, or 290 (FIGS. 2A, 2B, 3) or such as feed additive assembly 870 or 880 (FIG. 2C), an operator positions Applicants' mobile feed preparation mobile feed preparation apparatus, adjacent to a feed additive preparation area. In certain embodiments, a hose is employed to connect the mixing tank of each feed additive preparation station with a reservoir of a feed additive assembly on a feed truck, whereby the feed additive composition is pumped into the reservoir. In other embodiments, the feed additive composition is transferred through the hose and into the container by compressed air, vacuum, or suction. In yet other embodiments, the feed additive composition is transferred to the container by a mechanical conveyance means such as a screw conveyor. In such embodiments, the tubing can be rigid, semi-rigid, or flexible and can be either hose, tubing, pipe, or other similar structure.

As those skilled in the art will appreciate, it is important for each feed additive composition to be loaded into the proper feed additive assembly on Applicants' mobile feed preparation mobile feed preparation apparatus. In certain embodiments, to ensure that the proper interconnection is made between a mixing tank 708 in a preparation area and to the proper inlet assembly 390 (FIG. 6) on Applicants' mobile feed preparation mobile feed preparation apparatus, an inlet pressure sensor/gauge 399 (FIG. 6) monitors an increase in pressure when the delivery system is pressurized. In such embodiments, inlet pressure sensor/gauge 399 and controller 400 verify that the feed additive reservoir is about to receive a designated feed additive composition prior to opening initiating the transfer.

In certain embodiments, different feed additive compositions may be conveyed to Applicants' mobile feed preparation mobile feed preparation apparatus, using piping comprising different couplings or adaptors, or comprising different mechanical dimensions or configurations, whereby the piping, couplings, or adaptors, will only interconnect a designated feed additive assembly reservoir to a designated feed mixing tank 708, thereby mechanically preventing an incorrect transfer of a feed additive composition. In other embodiments, an incorrect transfer of a feed additive composition from mixing tank 708 to a feed additive assembly is prevented by using an electronic interlock employing technologies such as RF transmissions, RFID, wireless communication, magnetic sensors, electronic visual identification, etc.

In certain embodiments, each container of a feed additive assembly on Applicants' mobile feed preparation mobile feed preparation apparatus has a different size or shape connector which allows only a single hose, or other form of piping, from a single mixing tank 708 to interconnect. Thus, each feed additive assembly reservoir can only receive a feed additive composition from a designated mixing tank 708 in the feed additive preparation area.

In certain embodiments, controller 726 of feed additive preparation station 700 communicates with controller 400 (FIG. 4) of Applicants' mobile feed preparation mobile feed preparation apparatus. In such embodiments, wireless communications module 732 wirelessly provides to controller 400 information, such as and without limitation the type of feed additive in mixing tank 708 and the amount. Such information may be used by controller 400 to, by way of example and not limitation, allow pumping of the feed additive only into a certain feed additive assembly or to allow only a given amount of the feed additive to be transferred.

After an interconnect between a mixing tank 708 of a feed additive preparation system and a reservoir of a feed additive assembly has been established and verified, the refilling process can begin. In certain embodiments, Applicants' mobile feed preparation apparatus comprises an inlet pressure transducer and automated inlet valve inline with feed additive input hose 392 (FIG. 6). In certain embodiments, a pump on mixing tank 708 may start to pump the prepared feed additive into a feed additive assembly reservoir. Controller 400 (FIG. 4) monitors the inlet pressure transducer to ensure that a feed additive composition transfer is being made to a correct input assembly. In certain embodiments, each reservoir of a feed additive assembly, such as reservoirs 272, 282, and 292 (FIGS. 2A, 2B, 3), comprises a sensor to monitor the level of feed additive composition disposed therein. In such embodiments, controller 400 sends a command to controller 726 of feed additive preparation station 700 to stop pumping when the feed additive assembly reservoir has been filled with a designated amount of feed additive composition.

In certain embodiments, feed additive assemblies 270, 280, and 290 (FIGS. 2A, 2B, 3) may be refilled one at a time. In certain embodiments, feed additive assemblies 270, 280, and 290 may be refilled simultaneously. In certain embodiments, feed additive assemblies 270, 280, and 290 are filled to an amount less than capacity.

In certain embodiments, controller 400 (FIG. 4) communicates with controller 726 at regular intervals during the refilling process. In certain embodiments, controller 400 communicates with controller 726 continuously during the refilling process. In such embodiments, as a safety precaution, if communication is interrupted while a feed additive assembly is being refilled, the pump may be automatically disabled and an operator notified.

As will be understood by one of ordinary skill in the art, to offload the feed additive composition in reservoirs 272, 282, and 292 (FIGS. 2A, 2B, 3) of feed additive assemblies 270, 280, and 290 (FIGS. 2A, 2B, 3) respectively, the process described above can be reversed. In certain embodiments, feed additive preparation station 700 further comprises a pressure transducer and a valve to facilitate the offloading of the feed additive composition using the correct hose.

In certain embodiments, prior to delivering feed, feed additive assemblies 270, 280, and 290 (FIGS. 2A and 2B) are calibrated using a loss of weight method while Applicants' mobile feed preparation mobile feed preparation apparatus is stationary to provide stable weight readings. In such embodiments, the distribution rate at which each assembly dispenses a feed additive at various feeding speeds can be calculated by determining a loss of weight of reservoirs 272, 283, and 292 (FIGS. 2A, 2B, 3) respectively, over known time intervals. Thus, during delivery, feeding speeds can be varied corresponding with the delivery rate of feed 150 to incorporate feed additive(s) in the correct proportion. The amount of a feed additive dispensed can be determined using the distribution rate and the length of time over which the feed was dispensed. Further, the amount of feed dispensed may additionally be determined by calculating a difference in weight of reservoirs 272, 282, and 292 just prior and subsequent to dispensing.

In operation, an operator positions Applicants' mobile feed preparation mobile feed preparation apparatus adjacent to a designated feeding site.

Applicants' mobile feed preparation apparatus is used to deliver pre-determined feed formulations to various feed bunks, wherein the feed formulation delivered to each bunk may vary. In certain embodiments, controller 400 verifies the feed bunk to be fill with a feed ration using GPS module 430 and the feeding site location recited in feed delivery database 426. GPS module 430, using optional antenna 432, determines the actual location of mobile feed preparation apparatus and compares that actual location to the location for the selected feed bunk recited in feed delivery database 426. In certain embodiments, controller 400 verifies by receiving a wireless communication from a feed bunk capable of sending wireless RFID communications. In such embodiments, controller 400 verifies the delivery location using RFID module 440, wherein module 440 emits an interrogating signal and receives using antenna 442 a response signal identifying the adjacent feed bunk.

In certain embodiments, the method compares the actual feeding site location with the designated feeding site location recited in feed delivery database 426. If the actual feeding site location differs from the designated feeding site location, the method generates a Location Alert. The Location Alert is added to feed delivery database 426. In certain embodiments, controller 400 provides the Location Alert to a central feed lot server using wireless communications module 450 and antenna 452, and/or to a display device.

In certain embodiments, the method further comprises managing multiple feed ration types for a single load of feed. In such embodiments, controller 400 may store in feed delivery database 426 one or more feed delivery routes and feed ration types. In such embodiments, controller 400 evaluates the feed ration formulations in feed additive and ration formulation database 427 for each feed ration and may determine a common subformulation. By way of example and not limitation, a common Ration A may be used to formulate several other rations by the addition of various feed additives. Thus, by way of example and not limitation, Ration B may be formulated from Ration A by adding Feed Additive B to Ration A. Alternatively, Ration C may be formulated by adding Feed Additive C to Ration A. A third ration, Ration D, may be further formulated by adding both Feed Additives B and C to Ration A. In such embodiments, controller 400 uses the information in feed additive and ration formulation database 427 to produce Rations A, B, C, and D for the respective delivery locations specified in feed delivery database 426 by operating feed additive assemblies 270, 280, and/or 290 (FIGS. 2A, 2B, 3) to combine appropriate amounts of Feed Additives B and C with Ration A according to the formulations specified in feed additive and ration formulation database 427. As this example illustrates, and will be appreciated by one of ordinary skill in the art, different feed rations can be delivered to locations specified in feed delivery database 426 from the same load of feed 150 (Ration A in this example) by incorporation of one or more feed additives in the proper proportions as specified in feed additive and ration formulation database 427 and at the proper time during the feed delivery process.

As will be appreciated by one of ordinary skill in the art, feed ration types having different concentrations of the same additive may be delivered in a single load. By way of example and not limitation, Applicants' mobile feed preparation apparatus may deliver both Ration E and Ration F using the same load of feed. Ration E may comprise a base feed mixed with 0.1% (wt./wt.) of Feed Additive E, while Ration F may comprise the base feed mixed with 0.05% (wt./wt.) of Feed Additive E. When delivering Ration E and Ration F, Applicants' mobile feed preparation apparatus may separately produce Rations E and F or may use Ration E to produce Ration F. By way of example and not limitation, in certain embodiments controller 400 operates feed additive assembly 270, wherein reservoir 272 contains Additive E, to combine appropriate an appropriate amount of Feed Additive E with a base feed to make Ration E. Controller 400 may subsequently make Ration E by operating feed additive assembly 270 to combine the appropriate amount of Feed Additive E with the base feed. Alternatively, controller 400 may operate feed additive assembly 270 to produce Feed Additive E and then, where reservoir 282 of feed additive assembly 280 also contains Additive E, operate feed additive assembly 280 to add an additional amount of Feed Additive E to make Ration F.

Figure 1A:
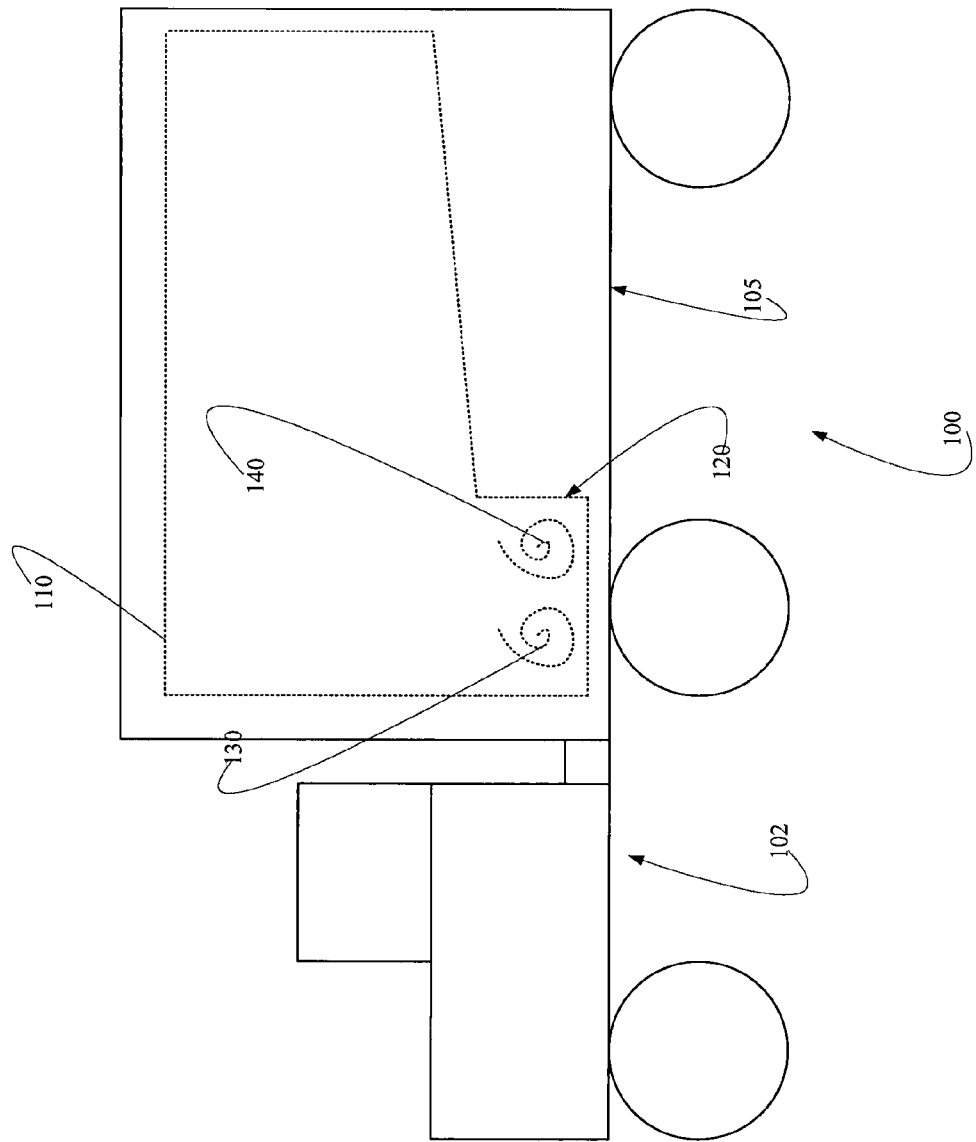
FIGS. 1A-1D illustrate prior art apparatus.
Figure 1B:
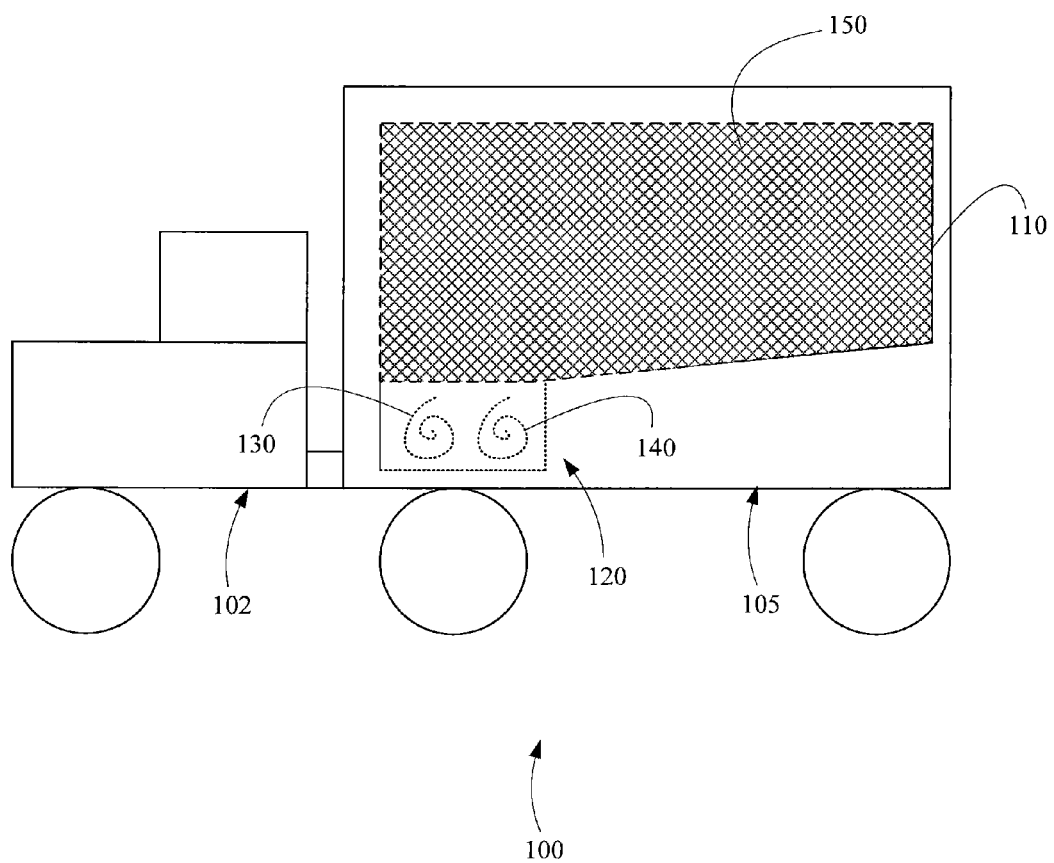
Figure 1C:
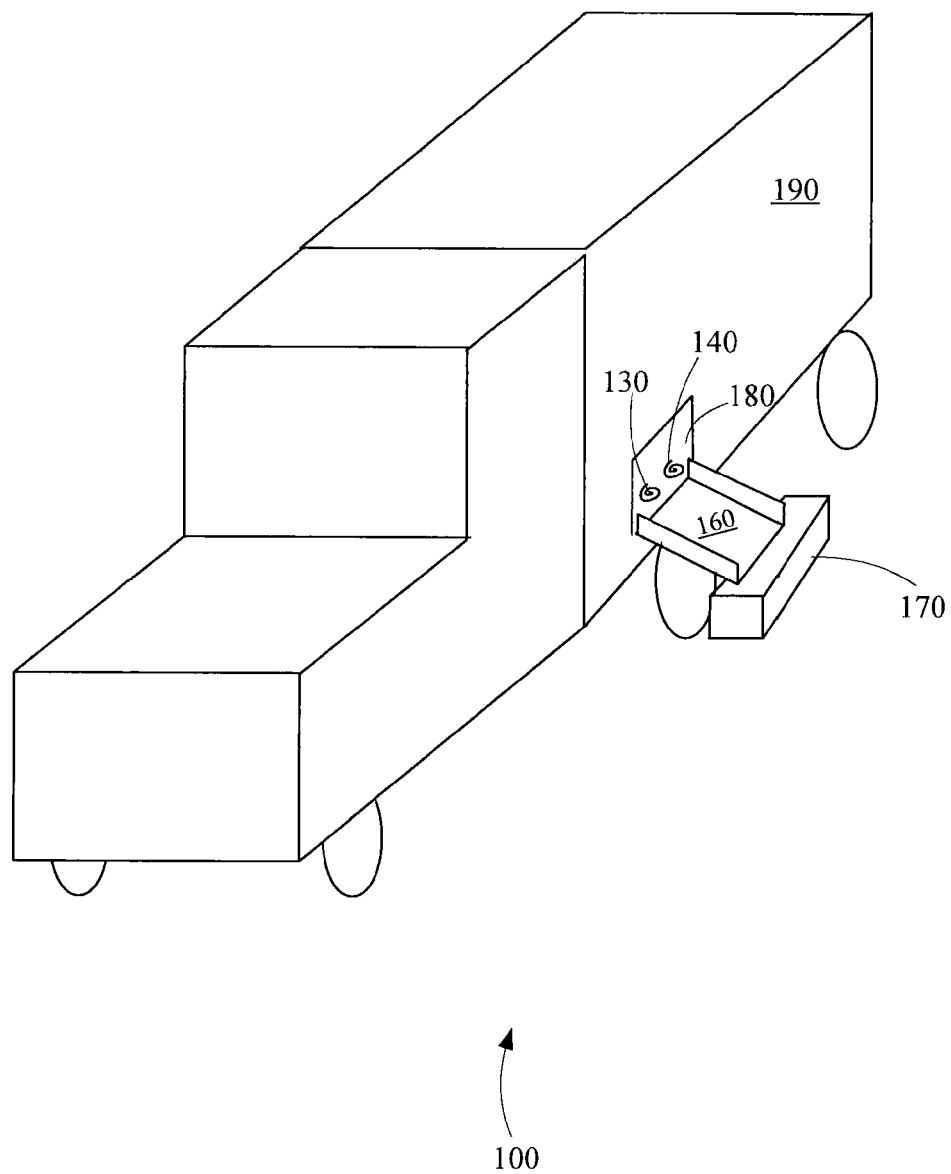
Figure 1D:
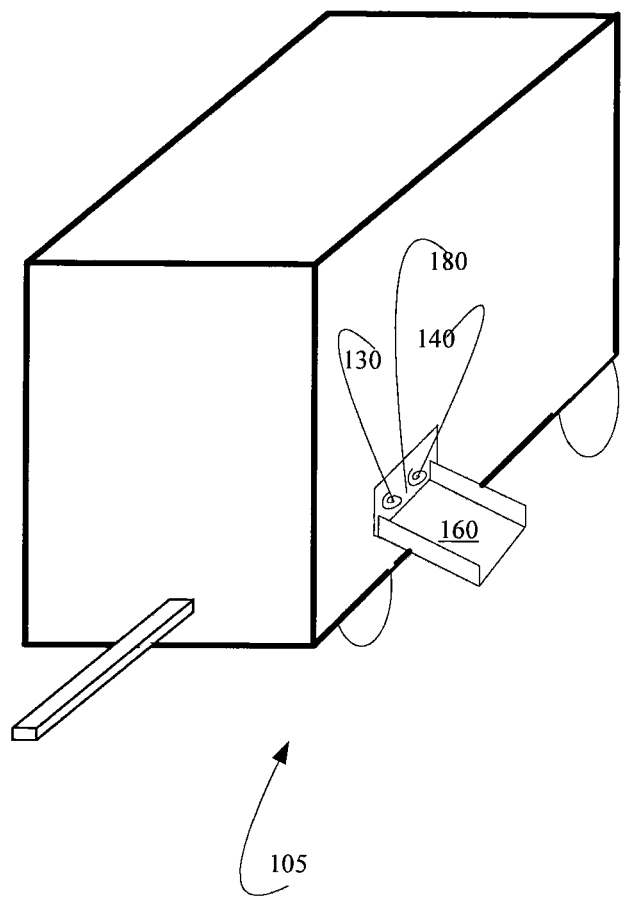

As will further be appreciated, Applicants' mobile feed preparation apparatus may deliver a feed ration type comprising one or more feed ration additives and no base feed. By way of example and not limitation, Ration G may comprise only Feed Additive G. In such an embodiment, controller 400 may operate feed additive assembly 270, where reservoir 272 contains Feed Additive G, to release an amount of Feed Additive G, which is then deposited in feed bunk 170 (FIG. 1C). In certain embodiments, this may be done alter the concentration or type of the feed ration currently in feed bunk 170. In such embodiments, controller 400 may use feed delivery database 426 to identify the existing feed ration type in feed bunk 170 and ration formulation database 427 to determine the amounts and/or types of additional feed additives to dispense to achieve the desired concentration or feed ration type. By way of example and not limitation, Ration F may have been delivered to feed bunk 170 at time A and a record of the delivery stored in feed delivery database 426. Controller 400 may then use ration formulation database 427 to determine the correct additives to dispense to Ration F, already located in feed bunk 170, to change Ration F to Ration G.

In certain embodiments, data stored in feed additive and ration formulation database 427 and feed delivery database 426 may be exchanged with a central feed lot server using wireless communication module 450 and wireless communication antenna 452. In certain embodiments, controller 400 periodically receives from a central feed lot server wireless updates to the feed delivery schedule to reflect changes in circumstances, such as and without limitation, arrival of new cattle or the movement of cattle from one feeding location to another. In such embodiments, controller 400 may display instructions informing the vehicle operator of the modified schedule. In certain embodiments, the vehicle operator may change the delivery order specified by the schedule due to special circumstances, such as, and without limitation, an obstruction in the delivery route. In certain embodiments, feeding results information stored in feed delivery database 426 may be transmitted to a central feed lot server.

In the illustrated embodiment of FIG. 5, feed delivery database 426 comprises (N) formulations. Referring now to FIGS. 2, 4, and 5, in the illustrated embodiment of FIG. 5, feed delivery database 426 recites that, for example, a pre-set quantity of 1000 pounds of feed 150 are targeted for delivery to the North Feed Bunk. Feed delivery database 426 further recites that, for example, 950 pounds were actually delivered to the North Feed Bunk.

Processor 410 enters the actual delivered amount into feed delivery database 426. In certain embodiments, the actual weight of feed delivered is wirelessly provided to a central feed lot server using wireless communications module 450 and antenna 452, and/or to a display device. Further in the illustrated embodiment feed delivery database 426 in FIG. 5, the nominal delivery window for delivery of base feed to the North Feed Bunk is, for example, +/− ten percent (10%). Because the actual amount delivered, i.e. 950 pounds, is within the pre-determined nominal window of 900 pounds to 1100 pounds, no alert was generated with respect to the amount of base feed delivered to the North Feed Bunk.

In certain embodiments, to stop the discharge of feed to a feed bunk, the operator signals controller 400 to cease delivery. In certain embodiments, controller 400 uses statistical information to determine the amount of base feed that will continue to be dispensed subsequent to the shutdown of the feed conveyor to regulate the remaining flow of feed additive.

Referring now to FIG. 3, in certain embodiments, after a feed additive is delivered via feed additive assembly 270, conduit 276, feed additive manifold 378, and spray assembly 398 are flushed. Similarly, in certain embodiments, after a feed additive is delivered, conduit 286 and/or conduit 296 are flushed. In such embodiments, conduit 271, 281, and/or 291 are connected via conduits 310, 320, and 330, respectively to discharge assembly 301, which is further connected to controller 400.

In certain embodiments, controller 400 operates discharge assembly 301 to inject pressurized air or other gas into conduits 271, 281, and 291 to flush any remaining feed additive in conduits, 276, 286, and/or 296, feed additive manifold 378, and spray assembly 398. In such embodiments, discharge assembly 301 comprises an air compressor. In other such embodiments, discharge assembly 301 comprises a pressurized vessel having pressurized air or other gas therein.

In certain embodiments, controller 400 operates discharge assembly 301 to inject pressurized water or other fluid through conduits 310, 330, and 320 to flush any remaining feed additive in conduits, 276, 286, and/or 296 respectively, feed additive manifold 378, and spray assembly 398. In such embodiments, discharge assembly 301 comprises a reservoir having water or other fluid stored therein. In certain such embodiments, the reservoir is under pressure. In certain such embodiments, the reservoir comprises a piston, wherein the piston applies a force onto the fluid therein. In certain such embodiments, discharge assembly 301 further comprises a pump to exert a force on the water or other fluid within the reservoir.

In certain embodiments where discharge assembly 301 is used to flush any remaining feed additive in conduits 276, 286, and/or 296, feed additive manifold 378, and spray assembly 398, controller 400 monitors the amount of feed additive flushed as well as the position of mobile feed preparation apparatus along the feed bunk. In certain embodiments, controller 400 operates discharge assembly 301 when exit chute 236 (FIGS. 2A, 2B, and 2C) is not over a feed bunk. In other embodiments, controller 400 operates discharge assembly 301 while exit chute 236 is over a feed bunk to discharge excess feed additive into the feed bunk. In certain such embodiments, controller 400 verifies that the feed bunk the excess feed additive will be flushed into is the same feed bunk as the last feed ration was delivered to.

In certain embodiments, controller 400 causes one or more open valves 274, 284, 294, to close while Applicants' feed truck is still delivering a feed ration comprising one or more feed additives to a designated feed bunk. Based upon the length of the designated feed bunk, and based upon the forward speed of the mobile feed preparation apparatus, controller 400 calculates a time interval in which valves 274, and/or 284, and/or 294, are closed, but wherein feed additives are still draining from conduits 276, and/or 286, and/or 296, into feed additive manifold 378, and wherein feed additives resident in feed additive manifold 378 are still entering into, and being sprayed from, spray assembly 398 onto a base feed being delivered to the designated feed bunk.

Returning to FIGS. 4 and 5, in certain embodiments, while feed is being delivered to the feed bunk, controller 400 visually displays information to assist the operator in moving mobile feed preparation apparatus along the feed bunk at an appropriate speed. In certain embodiments, the information includes the amount of feed delivered or remaining to be delivered and the corresponding progress along the feed bunk traveled. In certain embodiments, such information is displayed graphically. In other such embodiments, the information is displayed numerically. In certain embodiments, controller 400 emits an audible alert indicating to the operator that the operator's speed is too fast or to slow relative to the remaining feed to be distributed and the length of the feed bunk 170 left to travel or when Applicants' mobile feed preparation apparatus is not in proper position to deliver feed to specified feed bunk 170 while feed is being discharged into feed bunk.

In certain embodiments, the position of Applicants' mobile feed preparation apparatus with respect to the feed bunk is determined using GPS module 430, using optional antenna 432. In other embodiments, the position is determined using an accelerometer. In yet other embodiments, the position is determined using one or more radio frequency devices, an ultrasonic device utilizing time of flight or Doppler shift to determine speed and/or distance traveled, or one or more photo sensitive devices to determine position or distance traveled, or any combination thereof.

Further in the illustrated embodiment feed delivery database 426 in FIGS. 4 and 5, Additive A is to be added to the base feed to give a loading of 5 weight percent. In certain embodiments, controller 400 determines the weight of Additive A to be added to the base feed using feed additive and ration formulation database 427. Controller 400 opens valve 274, thereby causing Additive A to flow from reservoir 272, through valve 274, through conduit 276, and into the auger assembly 210 (FIG. 2A). Measurement device 254 determines the actual amount of Additive A added to the base feed delivered to the North Feed Bunk, and provides that weight to controller 400. In certain embodiments, the actual weight of Additive A added to the base feed is wirelessly provided to a central feed lot server using wireless communications module 450 and antenna 452, and/or to a display device.

In certain embodiments, controller 400 calculates a weight percent loading of Additive A in the base feed using the weights provided by measurement devices 252 and 254 (FIGS. 2A, 2B, 3). In certain embodiments, controller 400 then records the actual weight percent of Additive A in the base feed into feed delivery database 426. In certain embodiments, controller 400 further determines if the actual loading of Additive A is within the nominal window for Additive A. In certain embodiments, the actual weight percentage of Additive A in the base feed is provided wirelessly to a central feed lot server using wireless communications module 450 and antenna 452 for consideration in subsequent feedings.

Similarly, controller 400 calculates a weight percent loading of Additive B in the base feed using the weights provided by measurement devices 254 and 256 (FIGS. 2A, 2B, 3), and a weight percent loading of Additive C in the base feed using the weights provided by measurement devices 256 and 258 (FIGS. 2A, 2B, 3).

As will be appreciated by one of ordinary skill in the art, while the present discussion is presented in terms of a weight percent loading, the formulas for the various feed rations may be provided in any form with out departing from the scope of the present invention. By way of example and not limitation, a feed ration may be described in terms of grams per ton of feed. In such an embodiment, feed delivery database 426 additionally include a weight per mass measurement of each feed additive. In such an embodiment, controller 400 determines a mass of a feed additive being added based on the weight provided by measurement devices 252 and 254 (FIGS. 2A, 2B, 3).

In certain embodiments, controller 400 adjusts the rate at which Additive A, Additive B, and/or Additive C is added to the base feed based upon the actual feed delivery rate and the feed additive flow rate. In such embodiments, controller 400 adjusts the rate at which Additive A, Additive B, and/or Additive C is added to the base feed to match the actual feed delivery rate.

The nominal delivery window for Additive A at the North Feed Bunk is +/− ten percent (10%). Because the actual 3 weight percent loading of Additive A is outside the predetermined nominal window of 4.5 weight percent to 5.5 weight percent, in certain embodiments, controller 400 generates an Additive A Alert with respect to the amount of added to the base feed delivered to the North Feed Bunk. The Additive A Alert is added to feed delivery database 426. In certain embodiments, the Additive A Alert is provided wirelessly to a central feed lot server using wireless communications module 450 and antenna 452, and/or to a display device.

Controller 400 similarly determines the loadings of additional additives, such as for example Additive B and/or Additive C, using feed delivery database 426, and opens the one or more corresponding valves, such as valves 284 and/or 294 (FIGS. 2A, 2B, 3). Weigh cells 256 and/or 258 (FIGS. 2A, 2B, 3) determine the actual weights of Additives B and C, respectively, added to the feed formulation, and provide those actual weights to controller 400. Controller 400 then calculates the actual weight percent loadings of Additives B and/or C, determines if the actual weight percent loadings fall within pre-set nominal windows, and optionally generates, records, and provides an alert for Additive B and/or Additive C if the actual loadings are not within the designated pre-set nominal windows. In certain embodiments, the Additive B Alert and/or Additive C Alert is provided wirelessly to a central feed lot server using wireless communications module 450 and antenna 452, and/or to a display device.

In certain embodiments, controller 400 updates feed additive inventory database 428 each time a feed ration is delivered. In such embodiments, once measurement device 254 determines the actual amount of an additive, for example Additive A, added to the base feed to make Ration A and provides the weight to controller 400, controller 400 updates a record in feed additive inventory database 428. In certain embodiments, the record may be the total amount of Additive A available for distribution. In other embodiments, the record may be the total amount of Additive A delivered that day, week, month, or other time interval. In other embodiments, the record may be the total amount of Ration A delivered or available for delivery. In other embodiments, the record may be any other type of inventory record. In certain embodiments, the updated feed additive inventory database 428 is then wirelessly provided to a central feed lot server using wireless communications module 450 and antenna 452, and/or to a display device. In other embodiments, the actual amount a feed additive delivered is wirelessly provided to the central feed lot server to update an inventory database maintained by the central feed lot server.

In certain embodiments, the total amount of a given feed additive, for example Additive A, distributed can be reconciled against the total amount of Additive A delivered according to an inventory database, either feed additive inventory database 428 or an inventory database maintained by the central feed lot server. In such embodiments, the remaining feed in each reservoir, such as reservoirs 272, 282, and 292 (FIGS. 2A, 2B, and 3) or reservoirs 872 and 882 (FIG. 2C), may be weighed using weigh cells 255, 257, and 259 (FIG. 2A) before and after each delivery and compared to the amount of feed delivered according to the inventory database. In certain embodiments, such reconciliation may occur after each time feed is delivered to a feed bunk, when mobile feed preparation apparatus has returned to the feedmill or central feed lot office after distributing feed rations, or at any other time interval. In certain embodiments, if the actual amount delivered is not the same as the amount of feed delivered according to the inventory database, an Incorrect Feed Delivery Alert is generated. In certain embodiments, controller 400 wirelessly provides the Incorrect Feed Delivery Alert to a central feed lot server using wireless communications module 450 and antenna 452, and/or to a display device. In certain embodiments, the Incorrect Feed Delivery Alert is an audible alert and/or a visual display alert. In certain embodiments, if there is a discrepancy, the feed bunk which received an incorrectly formulated feed ration can be identified and subsequently corrected.

As will be appreciated by one of ordinary skill in the art, by updating an inventory database, either feed additive inventory database 428 or a database maintained by the central feed lot server, with the actual amount of additive delivered after each time a feed additive is dispensed, Applicants' method is able to maintain an up-to-date, accurate inventory. Furthermore, such an up-to-date and accurate inventory database, either feed additive inventory database 428 or a database maintained by the central feed lot server, can be used as a quality control check to ensure the actual amount of inventory loss is reasonable in relation to the amount that should have been dispensed to produce a given feed ration. In certain embodiments, any discrepancy between the actual inventory loss in relation to the theoretical delivery amount for a given ration can be used as a calibration factor. By way of example and not limitation, feeding errors may occur for a number of reasons including, but not limited to, changes in bulk density, temperature influences, humidity, or product settling. In other embodiments, if there is a discrepancy, the feed bunk the associated feed ration was delivered to can be identified such that corrective action can be taken.

In certain embodiments, instructions, such as instructions 424 residing in computer readable medium 420, are executed by a processor, such as processor 410, to prepare and dispense a designated feed composition at a designated feeding site using Applicants' mobile feed preparation apparatus.

In certain embodiments, the method further includes scanning the animals within a particular location. In such embodiments, each animal has an RFID eartag capable of wirelessly sending data to a receiver identifying the animal. In such an embodiment, controller 400 using RFID module 440 receives a signal from an RFID eartag. In certain embodiments, controller 400 may then determine the approximate location of the animal by determining the location of mobile feed preparation apparatus using GPS module 430. Alternatively, the location of the animal may be included in the data received by controller 400 from the animal's eartag. In such embodiments, controller 400 verifies that the animals within a given area are in the proper pen using RFID module 440, wherein RFID module 440 emits and interrogating signal and receives, using antenna 442, a response signal from one or more eartags identifying the animals. If an animal is determined to be in an incorrect pen, controller 400 may wirelessly provide to a central feed lot server the location of the pen and identifying information for the incorrectly located animal using wireless communications module 450 and antenna 452.

In other such embodiments, controller 400 may use the identifying information received from the animal's RFID eartag to adjust the feed ration based on the identification of the animals within a given pen. In such embodiments, controller 400 verifies the identification of the animals within a pen using RFID module 440, wherein RFID module 440 emits an interrogating signal and receives, using antenna 442, a response signal from one or more eartags identifying the animals. Using feed additive and ration formulation database 427, controller 400 then determines the proper feed ration to be dispensed to the animals.

In certain embodiments, each time a feed ration is dispensed at a given feed pen, the amount dispensed and the location of mobile feed preparation apparatus is wirelessly provided to a central feed lot server using wireless communications module 450 and antenna 452, and/or to a display device, for billing purposes. In such embodiments, the location may be determined using GPS module 430. In other such embodiments, controller 400 may use wireless communications module 450 and antenna 452 to communicate with a transmitter affixed to a feed bunk or pen which transmits the location of that feed bunk or pen. In other embodiments, each pen or feed bunk is equipped with an RFID tag. In such embodiments, controller 400 verifies the identification of each pen or feed bunk using RFID module 440, wherein RFID module 440 emits an interrogating signal and receives, using antenna 442, a response signal from one or more tags identifying the pen or feed bunk.

In certain embodiments, the amount and location of the feed delivery is used by the central server to generate invoices to customers who have cattle housed in the feed yard. In such embodiments, an invoice is generated by the central server for the amount of rations delivered to the customer's cattle. In certain embodiments, different feed additives, and therefore feed ration types, are provided at different costs. In such embodiments, controller 400 additionally wirelessly provides to the central feed lot server the type of feed ration delivered using wireless communications module 450 and antenna 452. In such embodiments, an invoice is generated by the central server for the type of feed rations delivered as well as the amount. In certain embodiments, controller 400 may wirelessly provide the central server the type of feed additive dispensed either instead of or in addition to the feed ration type. In such embodiments, an invoice generated by the central server for the type of feed additive dispensed.

In certain embodiments, delivery of feed rations to different locations within the feed yard are associated with different costs. In such embodiments, the central server uses the amount and location of the feed delivery provided by controller 400 to generate an invoice that includes location-specific fees or discounts. In certain embodiments, various customers may be charged differently for the feeding of cattle. In such embodiments, the central server may use the location and feed amount provided by controller 400 to generate an invoice which includes customer-specific fees or discounts. In other such embodiments, controller 400 verifies the owner of the cattle being fed and wirelessly provides the identity to the central feed lot server. In such embodiments, controller 400 verifies the identification of the owner using RFID module 440, wherein RFID module 440 emits an interrogating signal and receives, using antenna 442, a response signal from one or more RFID tags on the pen or feed bunk identifying the owner of the cattle being feed.

In certain embodiments, controller 400 determines a price for the feed ration dispensed. In such embodiments, controller 400 uses feed cost database 429 to determine a cost for the feed ration delivered. In other such embodiments, controller 400 uses feed cost database 429 to determine a cost for the feed additive used to formulate the feed ration delivered. In certain embodiments, controller 400 uses feed cost database 429 to generate an invoice for the cost of the feed additive and/or feed ration delivered. In certain embodiments, controller 400 wirelessly provides the cost and/or invoice of the feed ration and/or feed additive to a central feed lot server using wireless communications module 450 and antenna 452, and/or to a display device.

While the preferred embodiments of the present invention have been illustrated in detail, it should be apparent that modifications and adaptations to those embodiments may occur to one skilled in the art without departing from the scope of the present invention.

We claim:

1. A method of feeding livestock, comprising:
providing a mobile feed preparation apparatus comprising a feed, a feed additive reservoir, feed additive disposed in said feed additive reservoir, and a weigh cell attached to the feed additive reservoir;
weighing the feed additive reservoir to determine a first weight of feed additive disposed therein;
spraying feed additive onto said feed;
weighing the feed additive reservoir to determine a second weight of feed additive disposed therein;
calculating a distributed amount of the feed additive using the first weight and the second weight;
a conduit having a first end in communication with said feed additive reservoir and a second end disposed adjacent a first end of an auger, a motor connected to said auger, a first end of a funnel disposed adjacent a second end of said auger, a discharge line having a first end attached to a second end of said funnel, and a spray assembly nozzle assembly attached to a second end of said discharge line;
said method further comprising:
transporting said feed additive particles to said funnel via said conduit and via said auger;

disposing said feed additive particles into said funnel and through said discharge line to said spray assembly;

wherein:

said spraying step comprises spraying said feed additive particles from said spray nozzle assembly;

the mobile feed preparation apparatus further comprises a controller;

the controller further comprises a wireless network communication module;

the method further comprising wirelessly providing a distributed amount of the feed additive to a computing device external to the mobile feed preparation apparatus.

2. The method of feeding livestock of claim 1 wherein the controller further comprises a processor in communication with a first non-transitory computer readable medium comprising a first database, wherein the first database includes a desired quantity of feed additive associated with the feed ration, further comprising:

determining, using the desired quantity of feed additive and the distributed amount of the feed additive, if an incorrect amount of the feed additive was distributed; and generating an alert when the incorrect amount of the feed additive was distributed.

3. The method of feeding livestock of claim 2, further comprising wirelessly providing the alert, when generated, to a computing device external to the mobile feed preparation apparatus.

4. The method of feeding livestock of claim 1, further comprising:

rotating said auger; and setting a speed of the auger.

5. The method of feeding livestock of claim 4, wherein said auger speed comprises a rate of movement of feed additive particles over a defined time interval.

6. The method of feeding livestock of claim 1, wherein the controller further comprises a processor in communication with a first non-transitory computer readable medium comprising a first database, wherein the first database includes a first inventory for the feed additive, the method further comprising updating the inventory with the distributed amount of the feed additive.

7. The method of feeding livestock of claim 6, the method further comprising wirelessly reconciling the updated first inventory with a second inventory stored on a second non-transitory computer readable medium of a computing device external to the mobile feed preparation apparatus.

8. The method of feeding livestock of claim 6, wherein the first non-transitory computer readable medium further comprises a second database, wherein the second database includes a price associated with the feed additive, the method further comprising calculating a cost, using the price associated with the feed additive, of the distributed amount of the feed additive.

9. The method of feeding livestock of claim 8, further comprising wirelessly providing the cost to a computing device external to the mobile feed preparation apparatus.

10. The method of feeding livestock of claim 1, wherein said mobile feed preparation apparatus further comprises a pressurized air discharge assembly in communication with said spray assembly, further comprising flushing said spray assembly using pressurized air.

11. The method of feeding livestock of claim 1, wherein said mobile feed preparation apparatus further comprises a chute and a static mixer attached to and extending outwardly from chute, wherein said static mixer comprises a plurality of members extending outwardly from an end of said chute;

wherein said method further comprises mixing said feed and said feed additive as said feed and said feed additive exit said mobile feed preparation apparatus via said chute.

* * * * *